US008259048B2

(12) United States Patent
Yamazaki et al.

(10) Patent No.: US 8,259,048 B2
(45) Date of Patent: *Sep. 4, 2012

(54) FIELD SEQUENTIAL LIQUID CRYSTAL DISPLAY DEVICE AND DRIVING METHOD THEREOF, AND HEAD MOUNTED DISPLAY

(75) Inventors: Shunpei Yamazaki, Tokyo (JP); Jun Koyama, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/902,382

(22) Filed: Oct. 12, 2010

(65) Prior Publication Data

US 2011/0025729 A1 Feb. 3, 2011

Related U.S. Application Data

(60) Continuation of application No. 10/989,520, filed on Nov. 17, 2004, now Pat. No. 7,834,830, and a division of application No. 09/427,639, filed on Oct. 27, 1999, now Pat. No. 7,317,438.

(30) Foreign Application Priority Data

Oct. 30, 1998 (JP) .................................. 10-310553

(51) Int. Cl.
G09G 5/10 (2006.01)
(52) U.S. Cl. .......................................................... 345/87
(58) Field of Classification Search .................. 345/39, 345/204, 690, 44–46, 82–83, 87–102; 349/43, 349/85, 151, 182
See application file for complete search history.

(56) References Cited

U.S. PATENT DOCUMENTS

| 4,090,219 A | 5/1978 | Ernstoff et al. |
| 4,750,813 A | 6/1988 | Ohwada et al. |
| 4,907,862 A | 3/1990 | Suntola |
| 5,327,229 A | 7/1994 | Konno et al. |
| 5,412,493 A | 5/1995 | Kunii et al. |
| 5,428,366 A | 6/1995 | Eichenlaub |
| 5,439,837 A | 8/1995 | Hata et al. |
| 5,528,262 A | 6/1996 | McDowall et al. |

(Continued)

FOREIGN PATENT DOCUMENTS

EP 0 618 386 A1 10/1994

(Continued)

OTHER PUBLICATIONS

T. Yoshida et al., "A Full-Color Thresholdless Antiferroelectric LCD Exhibiting Wide Viewing Angle with Fast Response Time", SID 97 Digest, pp. 841-844.

(Continued)

*Primary Examiner* — Abbas Abdulselam
(74) *Attorney, Agent, or Firm* — Nixon Peabody LLP; Jeffrey L. Costellia

(57) ABSTRACT

A display with high resolution and reduced flicker of image. The driving method of this invention, or the field sequential driving method, divides one frame of image into a plurality of subframes, i.e., divides the period of one image frame into a plurality of subframe periods; displays red, green and blue images during the corresponding subframe periods; and, when these color images are to be displayed, turns on the corresponding red, green and blue backlights successively to feed light to the display section.

16 Claims, 24 Drawing Sheets

U.S. PATENT DOCUMENTS

| | | | |
|---|---|---|---|
| 5,537,258 A | 7/1996 | Yamazaki et al. | |
| 5,556,113 A | 9/1996 | Amorese et al. | |
| 5,594,569 A | 1/1997 | Konuma et al. | |
| 5,600,464 A | 2/1997 | Ohe et al. | |
| 5,617,243 A | 4/1997 | Yamazaki et al. | |
| 5,642,129 A | 6/1997 | Zavracky et al. | |
| 5,643,826 A | 7/1997 | Ohtani et al. | |
| 5,648,277 A | 7/1997 | Zhang et al. | |
| 5,684,498 A | 11/1997 | Welch et al. | |
| 5,844,538 A | 12/1998 | Shiraki et al. | |
| 5,914,761 A | 6/1999 | Ohe et al. | |
| 5,923,961 A | 7/1999 | Shibuya et al. | |
| 5,923,962 A | 7/1999 | Ohtani et al. | |
| 5,926,239 A | 7/1999 | Kumar et al. | |
| 6,043,859 A | 3/2000 | Maeda | |
| 6,078,304 A | 6/2000 | Miyazawa | |
| 6,088,070 A | 7/2000 | Ohtani et al. | |
| 6,108,058 A | 8/2000 | Uchida | |
| 6,115,094 A | 9/2000 | Fukunaga | |
| 6,172,671 B1 | 1/2001 | Shibuya et al. | |
| 6,188,379 B1 | 2/2001 | Kaneko | |
| 6,218,678 B1 | 4/2001 | Zhang et al. | |
| 6,262,438 B1 | 7/2001 | Yamazaki et al. | |
| 6,281,949 B1 | 8/2001 | Matsui et al. | |
| 6,300,927 B1 | 10/2001 | Kubota et al. | |
| 6,300,994 B1 | 10/2001 | Ohe et al. | |
| 6,320,568 B1 | 11/2001 | Zavracky | |
| 6,330,039 B2 | 12/2001 | Matsui et al. | |
| 6,380,560 B1 | 4/2002 | Yamazaki et al. | |
| 6,392,656 B1 | 5/2002 | Someya et al. | |
| 6,400,434 B1 | 6/2002 | Fukunaga | |
| 6,475,839 B2 | 11/2002 | Zhang et al. | |
| 6,490,014 B1 | 12/2002 | Ohtani et al. | |
| 6,504,594 B2 | 1/2003 | Ohe et al. | |
| 6,542,137 B2 | 4/2003 | Kimura et al. | |
| 6,577,292 B1 | 6/2003 | Miyazawa | |
| 6,617,612 B2 | 9/2003 | Zhang et al. | |
| 6,660,549 B2 | 12/2003 | Yamazaki et al. | |
| 6,730,932 B2 | 5/2004 | Yamazaki et al. | |
| 6,784,034 B1 | 8/2004 | Choi | |
| 6,825,823 B1 | 11/2004 | Taira et al. | |
| 6,844,907 B2 | 1/2005 | Ohe et al. | |
| 7,079,098 B2 | 7/2006 | Taira et al. | |
| 7,176,993 B2 | 2/2007 | Fukunaga | |
| 7,397,518 B1 | 7/2008 | Ohtani et al. | |
| 7,483,089 B2 | 1/2009 | Ohtani et al. | |
| 7,834,830 B2 * | 11/2010 | Yamazaki et al. | 345/87 |
| 2004/0164300 A1 | 8/2004 | Yamazaki et al. | |
| 2009/0015743 A1 | 1/2009 | Ohtani et al. | |
| 2009/0134395 A1 | 5/2009 | Ohtani et al. | |

FOREIGN PATENT DOCUMENTS

| | | |
|---|---|---|
| EP | 0 644 452 A2 | 3/1995 |
| EP | 0 662 773 A1 | 7/1995 |
| EP | 0 709 823 A2 | 5/1996 |
| EP | 0 762 370 A2 | 3/1997 |
| EP | 0 827 129 A2 | 3/1998 |
| JP | 05-210082 A | 8/1993 |
| JP | 06-347744 | 12/1994 |
| JP | 07-130652 | 5/1995 |
| JP | 07-135318 | 5/1995 |
| JP | 07-159786 | 6/1995 |
| JP | 07-199149 A | 8/1995 |
| JP | 08-78329 | 3/1996 |
| JP | 08-211361 A | 8/1996 |
| JP | 08-234161 A | 9/1996 |
| JP | 10-133233 A | 5/1998 |
| JP | 10-144929 A | 5/1998 |
| JP | 10-161140 A | 6/1998 |
| JP | 10-206893 A | 8/1998 |
| JP | 10-209465 A | 8/1998 |
| JP | 10-221717 A | 8/1998 |
| JP | 10-274789 A | 10/1998 |
| JP | 10-326080 A | 12/1998 |
| JP | 11-287977 A | 10/1999 |
| JP | 11-327492 A | 11/1999 |
| WO | WO 91/04508 A2 | 4/1991 |
| WO | WO 98/08213 | 2/1998 |

OTHER PUBLICATIONS

H. Furue et al., "Characteristics and Driving Scheme of Polymer-Stabilized Monostable FLCD Exhibiting Fast Response Time and High Contrast Ratio with Gray-Scale Capability", SID 98 Digest, pp. 782-785.

S. Inui et al., "Thresholdless antiferroelectricity in liquid crystals and its application to displays", J. Mater. Chem., 1996, 6(4), pp. 671-673.

T. Yoshihara, "Time DivideD Full Color LCD by FLC", EKISHO., 1999, 3(3), pp. 190-194.

M. Terada et al., "Half V-Shaped Switching Mode", Proceedings of 46$^{th}$ Spring Meetings of the Society for Applied Physics of Japan, 28p-V8, Mar. 1999, p. 1316.

T. Yoshida et al., "A Full-Color Thresholdless Antiferroelectric LCD Exhibiting Wide Viewing Angle with Fast Response Time", SID 97 Digest, vol. 28, pp. 841-844.

II. Furue et al., "Characteristics and Driving Scheme of Polymer-Stabilized Monostable FLCD Exhibiting Fast Response Time and High Contrast Ratio with Gray-Scale Capability", SID 98 Digest, vol. 29, pp. 782-785.

M. Terada et al., "Half V-Shaped Switching Mode", Proceedings of 46$^{th}$ Spring Meetings of the Society for Applied Physics of Japan, 28p-V8, Mar. 1999, No. 3, pp. 1316.

* cited by examiner

1513~1520 : porous anodic oxide films     1521~1524 : non-porous anodic oxide films

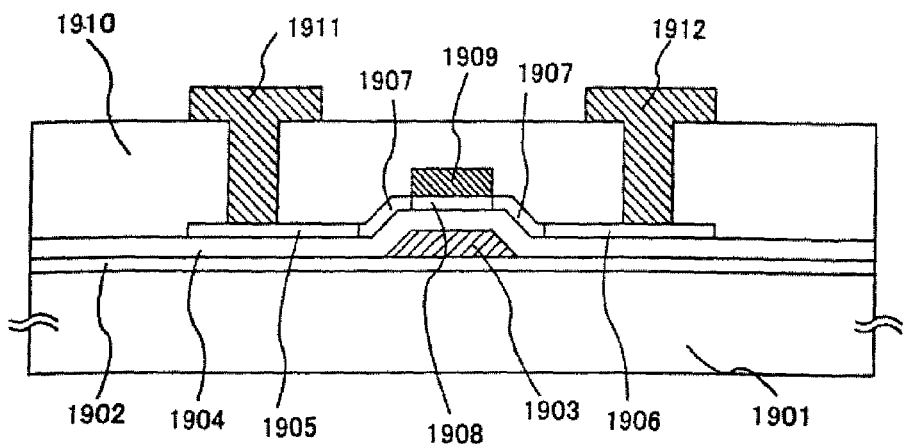

| | |
|---|---|
| 1901 substrate | 1907 LDD |
| 1902 silicon oxide film | 1908 channel forming region |
| 1903 gate electrode | 1909 channel protecting film |
| 1904 gate insulating film | 1910 interlayer insulator |
| 1905 source region | 1911 source electrode |
| 1906 drain region | 1912 drain electrode |

Fig. 19

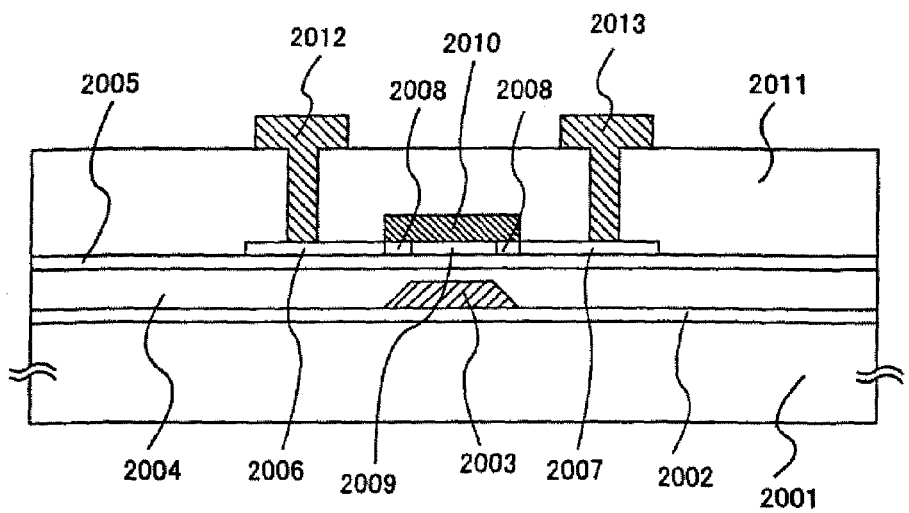

| | |
|---|---|
| 2001 substrate | 2008 (LDD) |
| 2002 silicon oxide film | 2009 channel forming region |
| 2003 gate electrode | 2010 channel protecting film |
| 2004 benzocyclobutene(BCB) | 2011 interlayer insulator |
| 2005 silicon nitride | 2012 source electrode |
| 2006 source region | 2013 drain electrode |
| 2007 drain region | |

Fig. 20

FIELD SEQUENTIAL LIQUID CRYSTAL DISPLAY DEVICE AND DRIVING METHOD THEREOF, AND HEAD MOUNTED DISPLAY

BACKGROUND OF THE INVENTION (1) Technical Field

The present invention relates to a field sequential liquid crystal display device capable of displaying color images, and the invention relates more specifically to an active matrix type liquid crystal display.

(2) Related Art

In recent years the active matrix liquid crystal display is being widely used for personal computers. It is not only used for the notebook type personal computers but also for the desktop personal computers with a large screen.

The active matrix liquid crystal display used on personal computers are required to display a plurality of information at one time and also to have a capability of full-color display at high definition level and with high quality.

The conventional active matrix color liquid crystal display forms a color image by passing white light through red, green and blue color filters provided over each of pixels. Hence, in the conventional active matrix color liquid crystal display, the resolution will be reduced to one third of that of the actual active matrix liquid crystal display. For example, an active matrix liquid crystal display having (640×3×480) pixels can only produce an image corresponding to the resolution of VGA standard, which is (640×480). An active matrix liquid crystal display with (800×3×600) pixels can only display an image corresponding to the resolution of SVGA standard, which is (800×600). Hence, to produce an image corresponding to high resolution requires three times the number of pixels.

To solve the problem described above, a study has been conducted recently on a method different from the conventional color display method. This driving method, called a field sequential driving method, divides one frame of image into three subframes and turns on red, green and blue backlights each for one-third frame duration to display an image corresponding to that color for one-third frame duration.

FIG. 22 is a timing chart of the conventional field sequential driving method. The timing chart of the conventional field sequential driving method in FIG. 22 shows a start signal for writing a video signal ($V_{sync}$ signal), turn-on timing signals (R, G and B) for red, green and blue LEDs, and a video signal (VIDEO). $T_f$ represents a frame period. $T_R$, $T_G$ and $T_B$ represent durations in which red, green and blue LEDs are lit, respectively.

A video signal supplied to the liquid crystal panel, for example $R_1$, is obtained by compressing an original red video signal entered from outside to one-third in the time axis direction. A video signal supplied to the liquid crystal panel, for example $G_1$, is obtained by compressing an original green video signal entered from outside to one-third in the time axis direction. A video signal supplied to the liquid crystal panel, for example $B_1$, is obtained by compressing an original blue video signal entered from outside to one-third in the time axis direction.

In the conventional field sequential driving method, the R, G and B LEDs are turned on successively during their corresponding LED turn-on periods $T_R$, $T_G$ and $T_B$. During the red LED turn-on period ($T_R$), a red video signal ($R_1$) is supplied to the liquid crystal panel to write one screenful of a red image on the liquid crystal panel. During the green LED turn-on period ($T_G$), a green video signal ($G_1$) is supplied to the liquid crystal panel to write one screenful of a green image on the liquid crystal panel. During the blue LED turn-on period ($T_B$), a blue video signal ($B_1$) is supplied to the liquid crystal panel to write one screenful of a blue image on the liquid crystal panel. These three screenfuls of image written into forms one frame.

The color display based on the conventional field sequential driving method has three times the resolution of the conventional color display. With this conventional field sequential driving method, however, because red, blue and green images are each displayed once for one-third the duration of one frame, the flicker of the screen becomes a very serious problem. Because of the flicker, the user cannot stand many hours of use of the display.

The present invention has been accomplished in view of the above-mentioned drawback and its object is to provide a display capable of minimizing the flicker and having a high resolution.

SUMMARY OF THE INVENTION

The present invention provides a driving method for the field sequential liquid crystal display, wherein one image frame comprises n (n is an integer of 2 or more) subframes, the subframes comprise red, green and blue images, and a red, a green or a blue backlight turns on corresponding to the display of the red, the green or the blue image.

The n may be 3.

The invention further provides a field sequential liquid crystal display which comprises: backlights for feeding red light, green light and blue light; and a display section for displaying an image when a voltage is applied to a liquid crystal; wherein the display section displays a plurality of frames in one second, the frame comprises n (n is an integer of 2 or more) subframes, the subframes comprise a red image, a green image and a blue image, and the backlights feed red light, green light or blue light to the display section when the red image, the green image or the blue image is to be displayed.

The n may be 3.

The liquid crystal may be a ferroelectric liquid crystal.

The invention further provides a field sequential liquid crystal display which comprises: backlights having a red LED, a green LED and a blue LED; and a display section for displaying an image when a voltage is applied to a liquid crystal; wherein the display section displays a plurality of frames in one second, the frame comprises n (n is an integer of 2 or more) subframes, the subframes comprise a red image, a green image and a blue image, and the red LED, the green LED or the blue LED feeds light to the display section when the red image, the green image or the blue image is to be displayed.

The n may be 3.

The liquid crystal may be a ferroelectric liquid crystal.

The invention further provides a head mounted display (HMD) using the field sequential liquid crystal display.

BRIEF DESCRIPTION OF THE DRAWINGS

FIG. 19 is a schematic diagram showing an example of LCD panel used in the liquid crystal display using the driving method of the invention.

FIG. 20 is a schematic diagram showing an example of LCD panel used in the liquid crystal display using the driving method of the invention.

DESCRIPTION OF THE PREFERRED EMBODIMENTS OF THE INVENTION

The driving method of this invention is a field sequential driving method which divides one frame of an image into a plurality of subframes, i.e., divides one frame interval into a plurality of subframe intervals, and displays red, green and blue images in the corresponding subframe intervals by turning on red, green and blue backlights to supply the corresponding colors of light to the display section.

Figure 1:
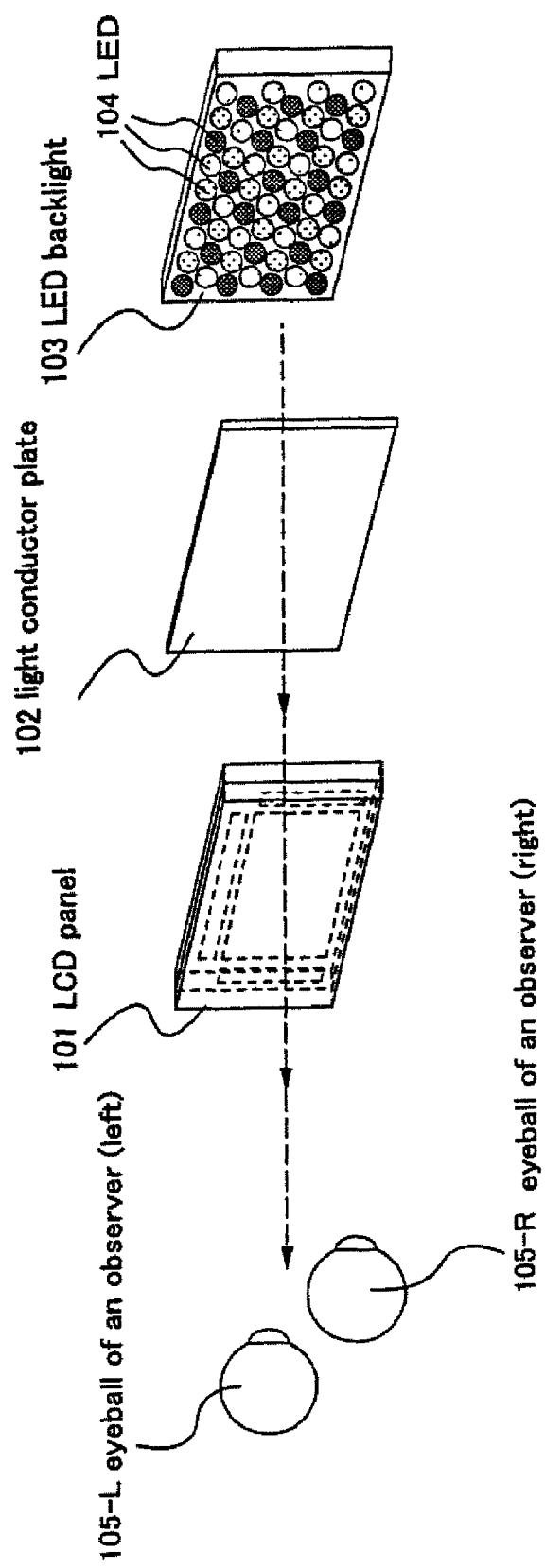
FIG. 1 is a schematic diagram showing the outline configuration of a liquid crystal display using the driving method according to the invention.

The driving method of the invention will be explained by referring to FIG. 1, which shows the outline configuration of a transmission type liquid crystal display using the driving method of the invention. Designated 101 is an LCD panel (liquid crystal display panel) which displays an image. Denoted 102 is a light conductor plate which makes light from the LED backlight a plane light source that is uniform in intensity in a plane. Reference number 103 represents an LED backlight with a plurality of LEDs (light emitting diodes) 104. The LED backlight 103 has a plurality of red (R), green (G) and blue (B) LEDs 104. Hence, the LED backlight 103 can be said to be a light source capable of supplying red, green and blue light. Denoted 105L and 105R are schematic representations of left and right eyeballs of an observer.

The red, blue or green light from the LED backlight 103 is rendered in-plane uniform light by the light conductor plate 102, which is then thrown onto the LCD panel 101. The light incident on the LCD panel 101 is optically modulated by the LCD panel and given image information. Here a pair of polarizing plates (not shown) with their polarization axes crossing at right angles to each other are arranged on both sides of the LCD panel 101. The light that was given image information by the LCD panel 101 is detected by the eyeballs 105L and 105R of the observer who now recognizes the image.

Figure 2:
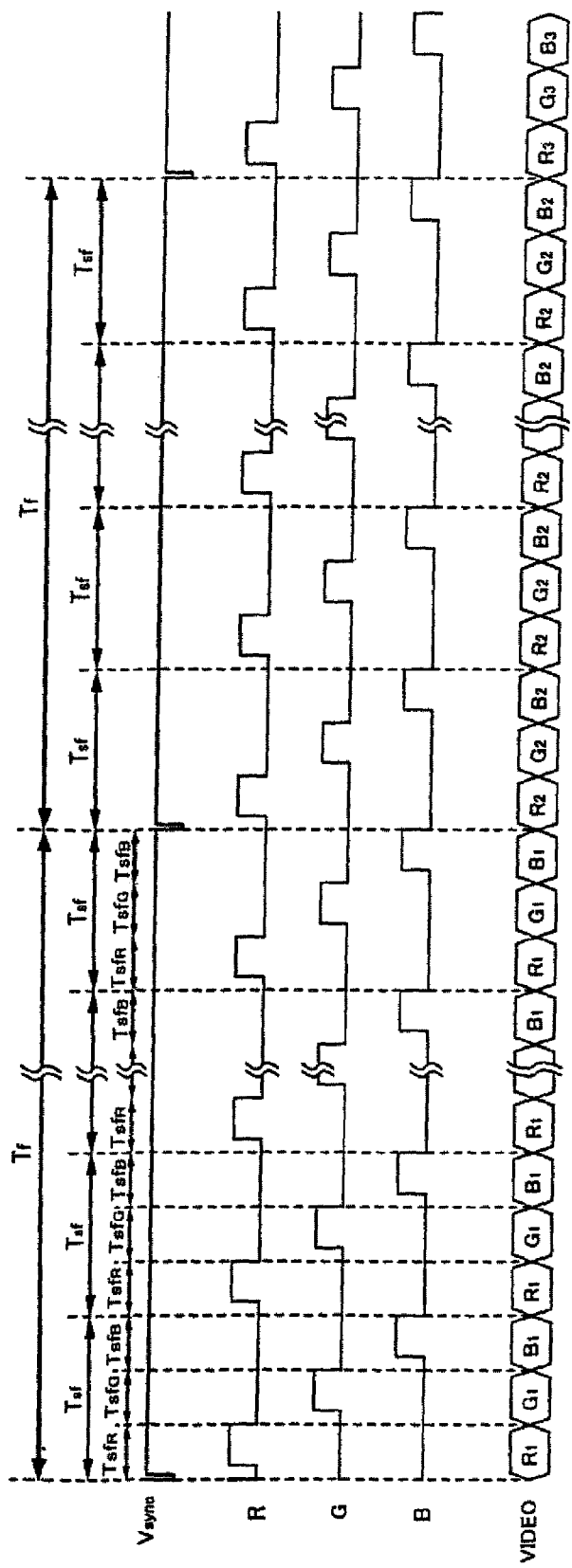
FIG. 2 is a timing chart of signals in the driving method of the invention.

A timing chart of the driving method of this invention is shown in FIG. 2. The timing chart of FIG. 2 shows a video signal writing start signal ($V_{sync}$ signal), red (R), green (G) and blue (B) LED turn-on timing signals (R, G and B), and a video signal (VIDEO). $T_f$ represents a frame period. $T_{sf}$ represents a subframe period, which is 1/n of the frame period $T_f$ ($T_f = n \cdot T_{sf}$, n is an integer of 2 or more). The one subframe period comprises a subframe R period ($T_{sfR}$) a subframe G period ($T_{sfG}$) and a subframe B period ($T_{sfB}$).

The video signal supplied to the liquid crystal panel, for example $R_1$, is obtained by compressing the original red video signal entered from outside (original video-R) by 1/(3n) times in the time axis direction. The video signal supplied to the liquid crystal panel, for example $G_1$, is obtained by compressing the original green video signal entered from outside (original video-G) by 1/(3n) times in the time axis direction. The video signal supplied to the liquid crystal panel, for example $B_1$, is obtained by compressing the original blue video signal entered from outside (original video-B) by 1/(3n) times in the time axis direction.

In the driving method of this invention, the R, G and B LEDs are turned on during the corresponding subframe R period $T_{sfR}$, subframe G period $T_{sfG}$, and subframe B period $T_{sfB}$. During the subframe R period $T_{sfR}$, the red video signal ($R_1$) is fed to the liquid crystal panel to write one screenful of a red image (subframe R) on the liquid crystal panel. During the subframe G period $T_{sfG}$, the green video signal ($G_1$) is fed to the liquid crystal panel to write one screenful of a green image (subframe G) on the liquid crystal panel. During the subframe B period $T_{sfB}$, the blue video signal ($B_1$) is fed to the liquid crystal panel to write one screenful of a blue image (subframe B) on the liquid crystal panel. That is, in the driving method of this invention, the video signal ($R_1$, $G_1$, $B_1$) is supplied during each subframe period ($T_{sf}$) to form one frame by writing a subframe n times.

When the driving method of this invention is used to rewrite 60 frames of image in a second, for example, the frame period is $T_f$=1/60 16.7 msec. Hence, the subframe period in this case is $T_{sf}$≈(16.7/n) msec. Each one-third of the subframe period $T_{sf}$ is the subframe R period $T_{sfR}$, the subframe G period $T_{sfG}$, and the subframe B period $T_{sfB}$ and thus $T_{sfR}$=$T_{sfG}$=$T_{sfB}$≈(5.57/n) msec.

Forming one frame of image with a plurality of subframes in this way realizes a high-speed rewriting of an image, significantly reducing the screen flicker experienced with the conventional device.

This invention will be explained in more detail in conjunction with the following embodiments.

(Embodiment 1)

Figure 3:
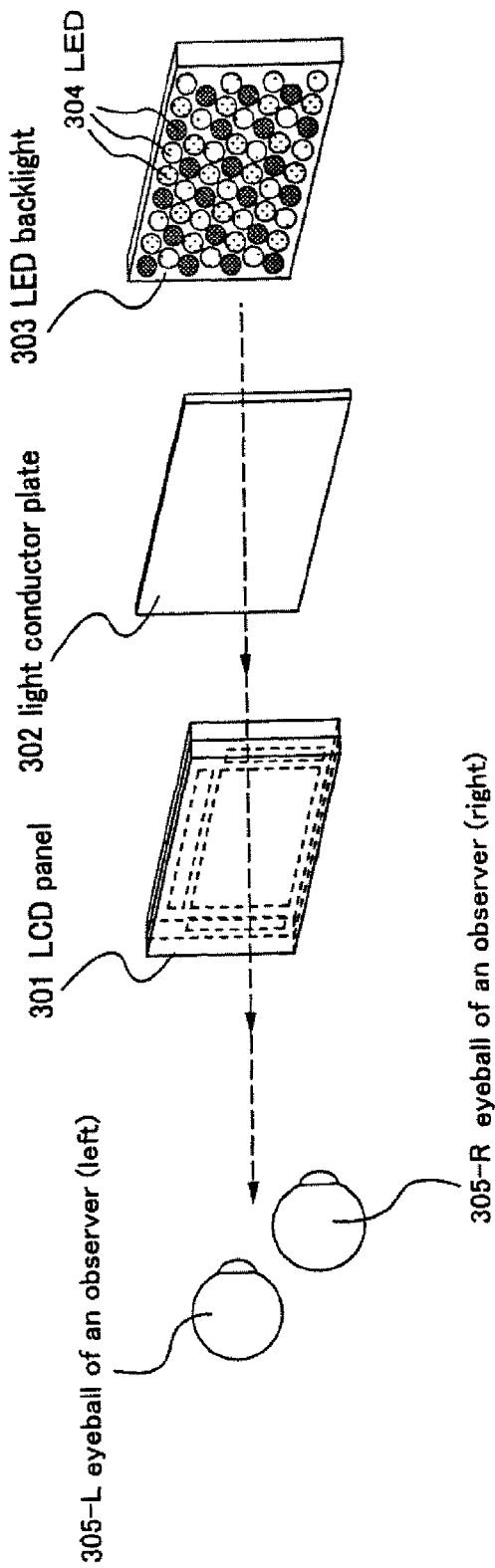
FIG. 3 is a schematic diagram showing one embodiment of a liquid crystal display using the driving method of the invention.

Let us turn to FIG. 3, which shows the outline configuration of a transmission type liquid crystal display using the driving method of this invention. The transmission type liquid crystal display of this embodiment has a resolution of 640×480 (so-called VGA). Denoted 301 is an LCD panel (liquid crystal panel) for displaying an image. Designated 302 is a light conductor plate to make the light from the LED backlight 303 in-plane uniform. That is, the light conductor plate 302 and LED backlight 303 together form an in-plane light source. The LED backlight 303 has a plurality of LEDs 304. The LED backlight has a plurality of groups of red (R), green (G) and blue (B) LEDs 304. Reference number 305L and 305R represent left and right eyeballs of an observer.

Figure 4:
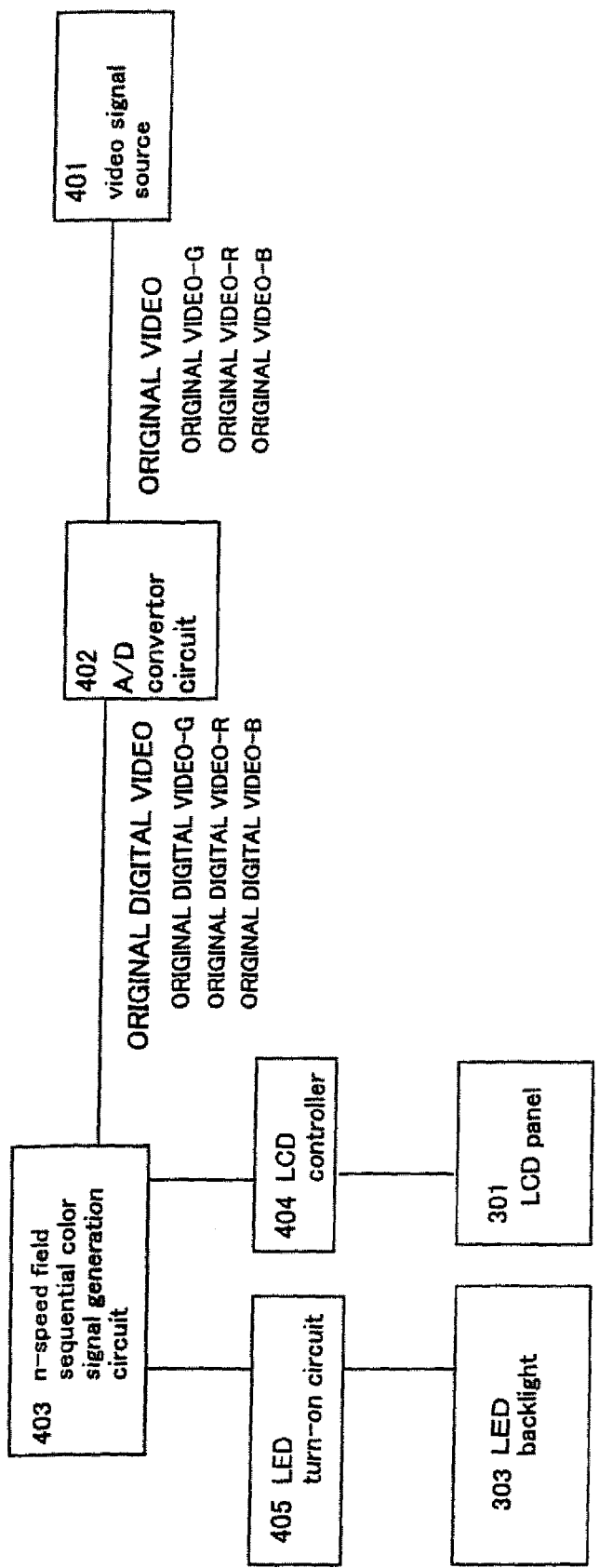
FIG. 4 is a block diagram showing the flows of signals in one embodiment of a liquid crystal display using the driving method of the invention.

The flow of signals in the transmission type liquid crystal display of this embodiment will be explained by referring to a block diagram (FIG. 4). In FIG. 4, reference number 401 represents a video signal source which feeds original image signals for R, G, B (original video-R, original video-G and original video-B) to an A/D converter circuit 402. The original video signal is converted by the A/D converter circuit 402 into the original digital sign. Then, these original digital video signals (original digital video-R, original digital video-G and original digital video-R) are supplied to an n-speed field sequential color signal generation circuit 403. The value of n is equal to that of n used for dividing one frame into n subframes. The n-speed field sequential color signal generation circuit 403 compresses the original video signals for R, G, B (original video-R, original video-G and original video-B) by 1/(3n) times in the time axis direction. Then, field sequential color video signals ($R_1$, $G_1$, $B_1$, $R_2$, $G_2$, $B_2$, . . . ) corresponding to the R, G, B and compressed by 1/(3n) times in the time axis direction are supplied to an LCD controller 404. At the same time, the n-speed field sequential color signal generation circuit 403 generates LED turn-on timing signals (R, G, B) for turning on the LEDs that are to be supplied to an LED turn-on circuit 405.

The LCD controller 404 supplies the field sequential color video signals successively to the LCD panel 301. The LED turn-on circuit 405 successively feeds the LED turn-on timing signals to the LED backlight 303.

Figure 14:
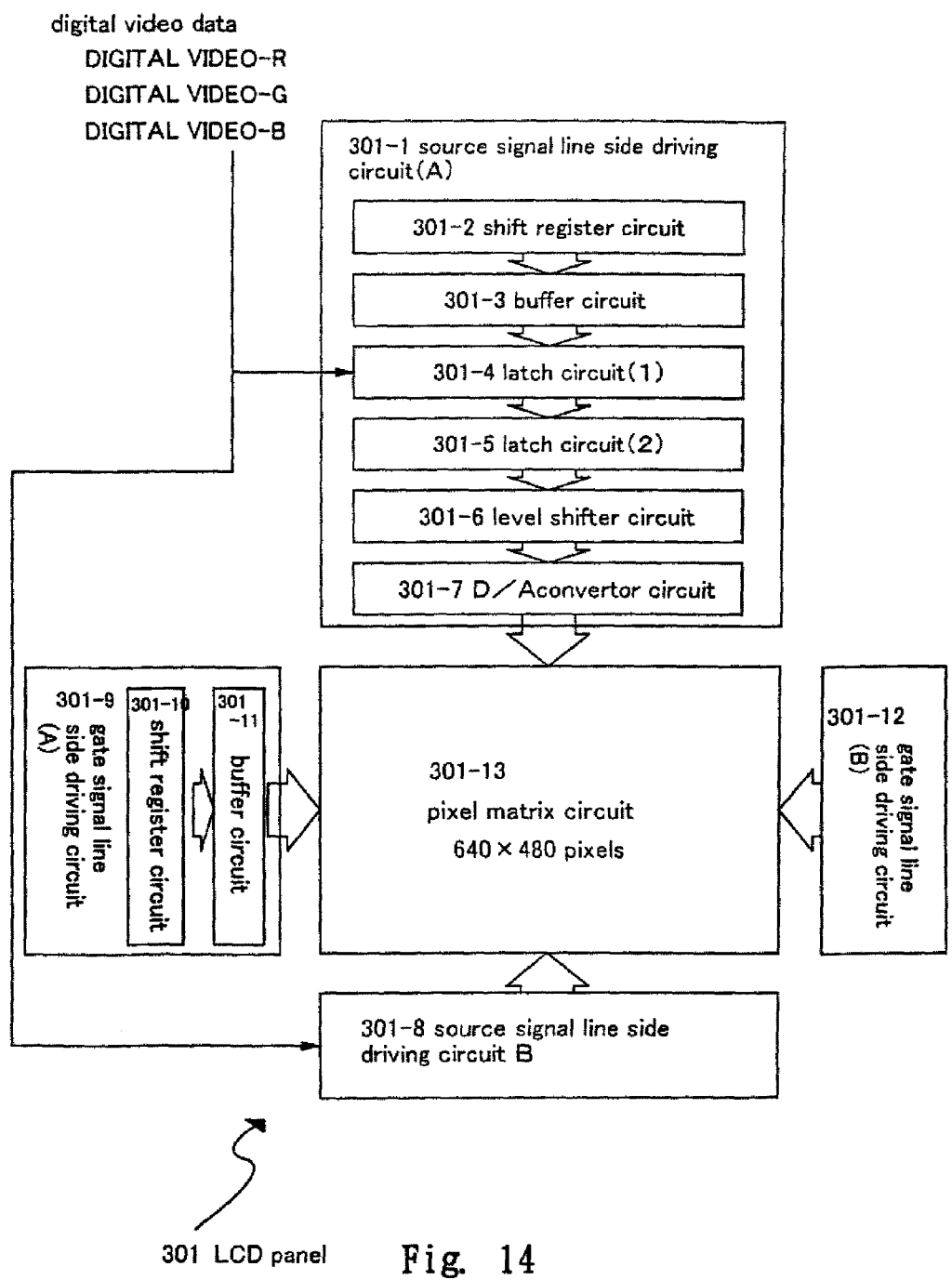
FIG. 14 is a schematic diagram showing the outline configuration of an LCD panel used in one embodiment of a liquid crystal display using the driving method of the invention.

A block diagram illustrating an outline configuration of the LCD panel is shown in FIG. 14. The LCD panel of this embodiment has a source signal line side driving circuit (A) 301-1, a source signal line side driving circuit (B) 301-8, a gate signal line side driving circuit (A) 301-9, a gate signal line side driving circuit (B) 301-12, and a pixel matrix circuit 301-13.

The source signal line side driving circuit (A) 301-1 comprises a shift register circuit 301-2, a buffer circuit 301-3, a latch circuit (1) 301-4, a latch circuit (2) 301-5, a level shifter circuit 301-6, and a D/A converter circuit 301-7. The source signal line side driving circuit (A) 301-1 supplies a video signal (gray scale voltage signal) to an odd-numbered source signal line.

The operation of the source signal line side driving circuit (A) 301-1 will be explained. The shift register circuit 301-2 receives a start pulse and a clock signal. Based on the start pulse and clock signal, the shift register circuit 301-2 feeds the timing signals successively to the buffer circuit 301-3. The shift register circuit 301-2 comprises a plurality of inverters and a plurality of clocked inverters.

The timing signal from the shift register circuit 301-2 is buffered by the buffer circuit 301-3. Because many circuits or elements are connected to the circuits ranging from the shift register circuit 301-2 to the source signal line connected to the pixel matrix circuit 301-13, these circuits have a large load capacitance. To prevent the timing signals from becoming "dull" due to the large load capacitance, the buffer circuit 301-3 is provided.

The timing signals buffered by the buffer circuit 301-3 are fed to the latch circuit (1) 301-4, which, when it receives the timing signals, successively takes in the digital video signal ($R_1$, $G_1$, $B_1$, $R_2$, $G_2$, $B_2$, . . . ) fed from the LCD controller and retains them.

The period of time during which the digital video signals are completely written into all latch circuits of the latch circuit (1) 301-4 is called one line period. That is, the time duration from the point of time at which the digital video signal starts to be written into the leftmost latch circuit of the latch circuit (1) 301-4 to the point of time at which the digital video signal is completely written into the rightmost latch circuit is one line period.

After the writing of the digital video signals into the latch circuit (1) 301-4 has finished, the digital video signals written into the latch circuit (1) 301-4 are sent to and written into the latch circuit (2) 301-5 at one time when a latch pulse flows through a latch pulse line connected to the latch circuit (2) 301-5 in synchronism with the operation timing of the shift register circuit 301-2.

The latch circuit (2) 301-5 that has sent out the digital video signals to the latch circuit (2) 301-5 is successively written again with digital video signals that are fed from the LCD controller 404 by the timing signal from the shift register circuit 301-2.

During the second 1-line period, the digital video signals sent to the latch circuit (2) 301-5 is supplied to the level shifter circuit 301-6 in synchronism with the start of the second 1-line period. The level shifter circuit 301-6 raises the voltage levels of the digital video signals which are then sent to the D/A converter circuit 301-7. The D/A converter circuit 301-7 converts the digital video signals into analog signals (gray scale voltages) and feeds them to the corresponding source signal lines. The analog signals supplied to the source signal lines are supplied to the pixel TFT's source regions of the pixel matrix circuit connected to the source signal lines.

In the gate signal line side driving circuit (A) 301-9, timing signals from the shift register 301-10 are fed to a buffer circuit 301-11 and then to the corresponding gate signal lines (scan lines). The gate signal lines are each connected with pixel TFT's gate electrodes for one line. Because all the pixel TFTs for one line must be turned on simultaneously, the buffer circuit 301-11 used has a large current-carrying capacity.

The scan signals from the gate signal line side shift register switch the corresponding pixel TFTs, and the analog signals (gray scale voltages) from the source signal line side driving circuit are supplied to the pixel TFTs to driving the liquid crystal molecules.

Denoted 301-8 is a source signal line side driving circuit (B) with the same configuration as that of the source signal line side driving circuit (A) 301-1. The source signal line side driving circuit (B) 301-8 feeds video signals to even-numbered source signal lines.

Designated 301-12 is a gate signal line side driving circuit (B) with the same configuration as that of the gate signal line side driving circuit (A) 301-9.

Figure 5:
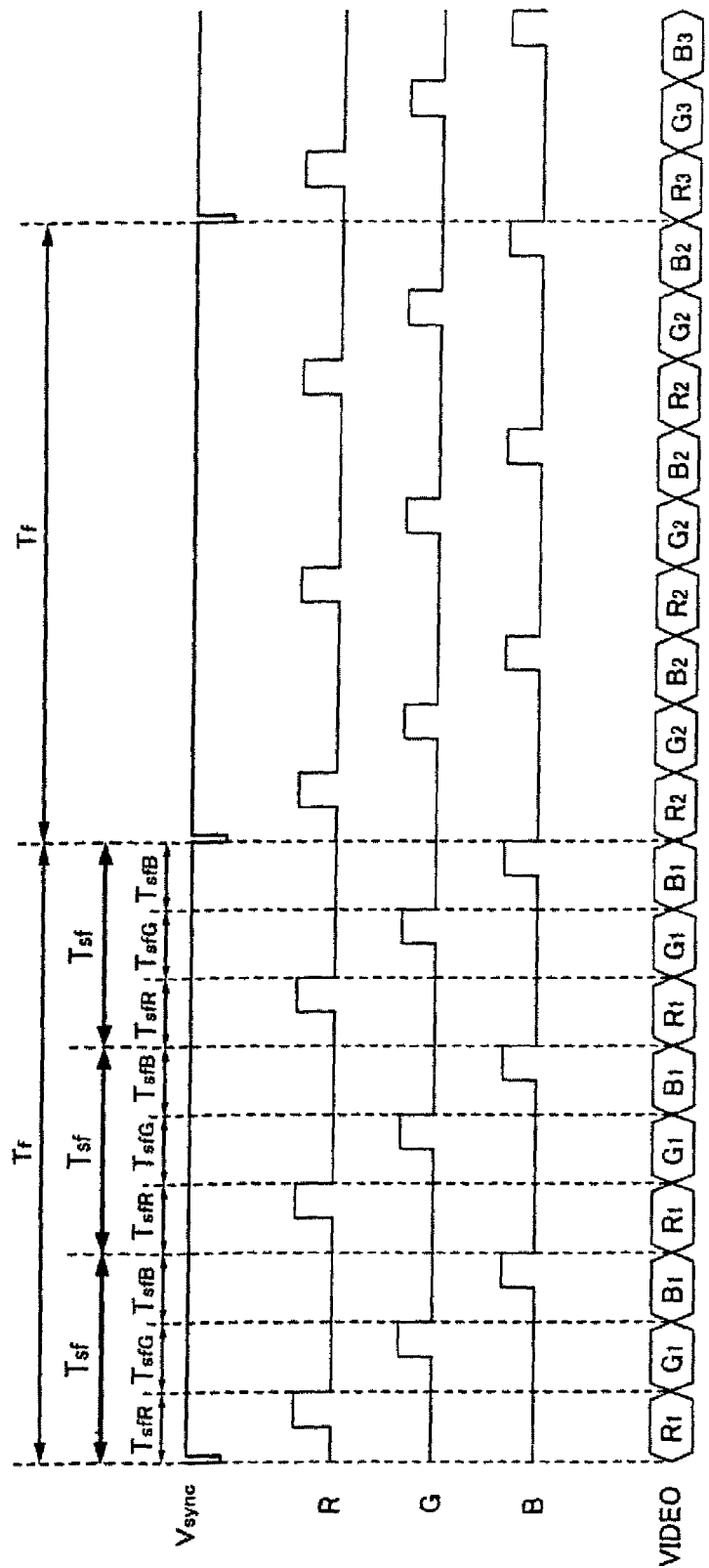
FIG. 5 is a timing chart of signals in one embodiment of a liquid crystal display using the driving method of the invention.

FIG. 5 shows a timing chart for the driving method of this embodiment with n=3. The timing chart of FIG. 5 shows a start signal of writing video signal ($V_{sync}$ signal), red (R), green (G) and blue (B) LED turn-on timing signals (R, G and B), and a video signals (VIDEO). $T_f$ represents a frame period. $T_{sf}$ represents a subframe period which is ⅓ of the frame period $T_f$ ($T_f=3 T_{sf}$).

The video signal fed to the LCD panel, for example $R_1$, is obtained by compressing the original red video signal entered from outside (original video-R) by 1/(3×3)=1/9 times in the time axis direction. The video signal fed to the LCD panel, for example $G_1$, is obtained by compressing the original green video signal entered from outside (original video-G) by 1/9 times in the time axis direction. The video signal fed to the LCD panel, for example $B_1$, is obtained by compressing the original blue video signal entered from outside (original video-B) by 1/9 times in the time axis direction.

In the driving method of this embodiment (n=3), the R, G and B LEDs are turned on during the subframe R period ($T_{sfR}$), subframe G period ($T_{sfG}$) and subframe B period ($T_{sfB}$), respectively. During the subframe R period $T_{sfR}$ the red digital video signal ($R_1$) is supplied to the liquid crystal panel to write one screenful of a red image (subframe R) on the liquid crystal panel. During the subframe G period $T_{sfG}$ the green digital video signal ($G_1$) is supplied to the liquid crystal panel to write one screenful of a green image (subframe G) on the liquid crystal panel. During the subframe B period $T_{sfB}$ the blue digital video signal ($B_1$) is supplied to the liquid crystal panel to write one screenful of a blue image (subframe B) on the liquid crystal panel. That is, in the driving method of the invention, the digital video signals ($R_1$, $G_1$, $B_1$) are supplied during each subframe period $T_{sf}$ and one frame is formed from three subframes.

When the image is rewritten at the rate of, for example, 60 frames per second, the subframe period is $T_{sf}=1/60/3≈5.56$ msec. Each one-third of this subframe period $T_{sf}$ is the subframe R period $T_{sfR}$, the subframe G period $T_{sfG}$, and the subframe B period $T_{sfB}$ and thus $T_{sfR}=T_{sfG}=T_{sfB}≈1.85$ msec.

Now, the operation of writing the digital video signal during the subframe R period $T_{sfR}=1.85$ msec will be explained. The transmission type liquid crystal display of this embodiment has a resolution of 640×480 and the source signal side driving circuit is capable of line-sequential driving of source signals. The liquid crystal material used in the transmission type liquid crystal display of this embodiment is a ferroelectric liquid crystal (with a response speed of 38 μsec), which is mixed with a photocurable liquid crystal acrylate monomer, injected into the transmission type liquid crystal display and then irradiated with ultraviolet rays. Hence the liquid crystal material exhibits a monostable characteristic.

The driving circuit used in this embodiment writes video data corresponding to a red image into 640 pixel TFTs for one line in about 2 μsec. Thus, the time taken for completely writing all pixels making up one subframe R is 2 μsec× 480=960 μsec=0.96 msec. Because the response time of the liquid crystal is 38 μsec, the time taken by the liquid crystal of the 480th line to respond is 0.998 msec from the point in time at which the pixels of the first line have begun to be written. Therefore, in the subframe R period $T_{sfR}$, the image writing into all the corresponding pixels is finished in the first 1.26 msec and, in the remaining 50 msec or so, the red LED turns on, allowing the image on the LCD panel to be recognized by an observer.

Likewise, during the next subframe G period $T_{sfG}$, the data corresponding to a green image is written into 640 pixel TFTs for one line in about 2 μsec. In the subframe G period $T_{sfG}$, the image writing into all the corresponding pixels is finished in the first 1.26 msec and, in the remaining 50 msec or so, the green LED turns on, allowing the image on the LCD panel to be recognized by an observer.

Likewise, during the next subframe B period $T_{sfB}$, the data corresponding to a blue image is written into 640 pixel TFTs for one line in about 2 μsec. In the subframe B period $T_{sfB}$, the image writing into all the corresponding pixels is finished in the first 1.26 msec and, in the remaining 50 msec or so, the blue LED turns on, allowing the image on the LCD panel to be recognized by an observer.

The subframe R period $T_{sfB}$, the subframe G period $T_{sfG}$ and the subframe B period $T_{sfB}$ comprise one subframe period $T_{sf}$. In this embodiment, this subframe period $T_{sf}$ is repeated three times in the same way.

By forming one frame of image with a plurality of subframes, a high-speed rewriting of image can be realized, thereby substantially reducing the flicker of image which was conventionally a problem.

Although we have described an example case of n=3, i.e., n-speed field sequential driving, the driving circuit of this invention can also be applied to other than n=3. It should be noted, however, how many speeds the field sequential driving will have depends on the response speed of the liquid crystal material used in the LCD panel and on the performance of the driving circuit.

While this embodiment employs an LCD panel that has a digital driving capable of handling digital video signals, it is also possible to convert the digital video signals into analog signals by the LCD controller and supply them to the LCD panel having an analog driver.

The driving method of this invention will be explained in more detail in conjunction with the following embodiments. However, the driving method of this invention is not limited to the following embodiments.

(Embodiment 2)

Figure 6:
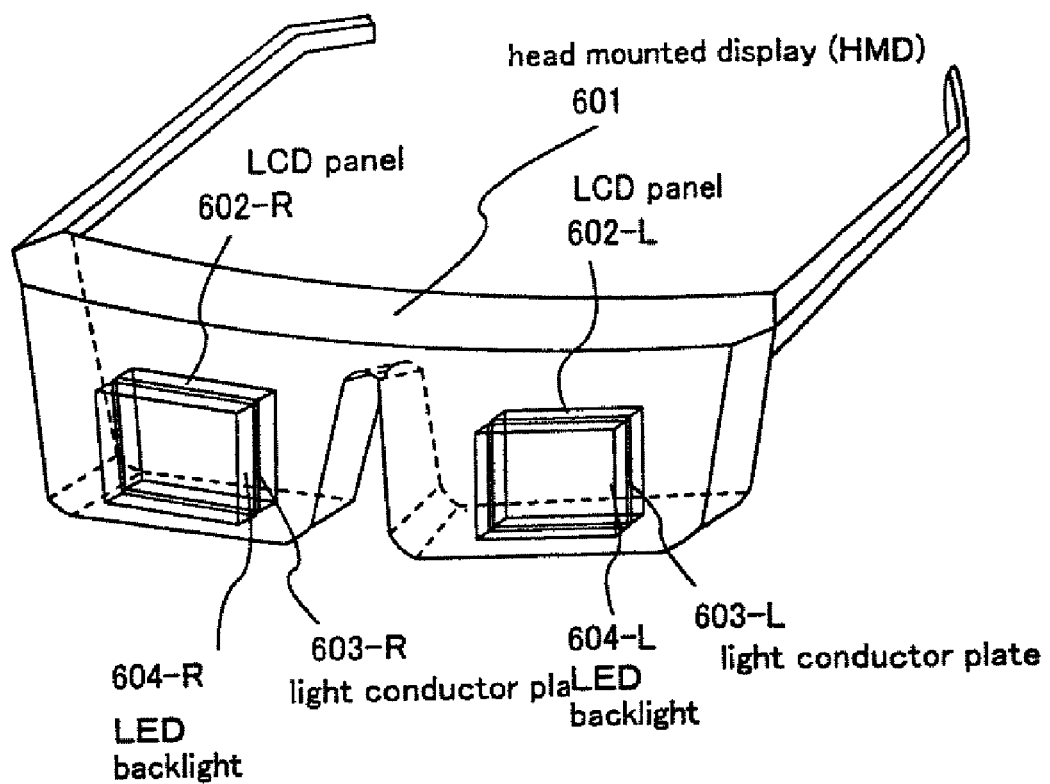
FIG. 6 is a schematic diagram showing the outline configuration of one embodiment of a HMD using the driving method of the invention.
Figure 7:
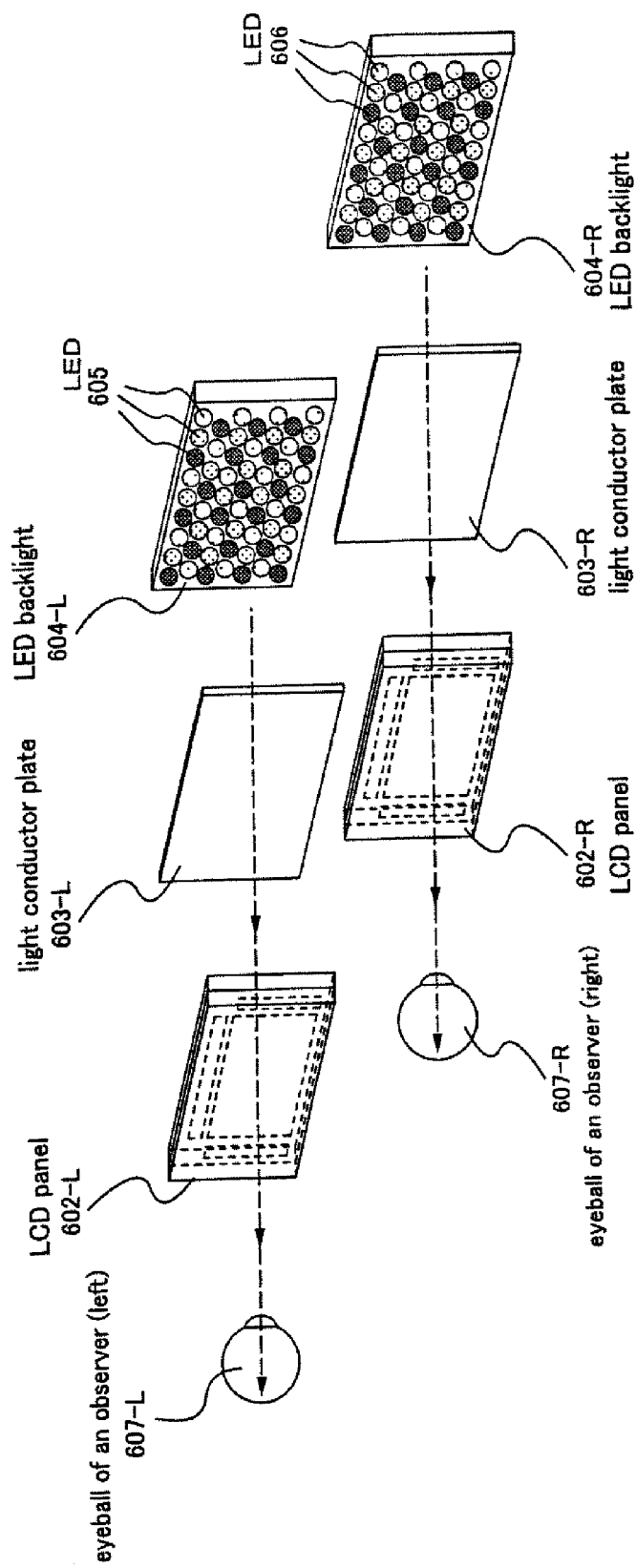
FIG. 7 is a schematic diagram showing the outline configuration of one embodiment of a HMD using the driving method of the invention.

In this embodiment we will explain about the head mounted display (HMD) using the driving method of this invention by referring to FIGS. 6 and 7. FIG. 6 shows the outline configuration of the HMD of this embodiment. Reference number 601 represents a HMD body; 602-R and 602-L are LCD panels; 603-R and 603-L are light conductor plates; and 604-R and 604-L are LED backlights. In FIGS. 7, 605 and 606 are LEDs; and 607-L and 607-R are eyeballs of an observer. The LCD panel 602-R offers an image for the right eye and the LCD panel 602-L offers an image for the left eye. Hence, the LCD panel 602-R and the LCD panel 602-L may offer the same image. It is also possible to provide different images on the LCD panel 602-R and on the LCD panel 602-L so that the observer can recognize a three-dimensional image.

The HMD of this embodiment is supplied video signals from the external video signal source (not shown). The HMD of this embodiment has a construction as shown in FIG. 4. In this embodiment, the A/D converter circuit, the n-speed field sequential color signal generation circuit, the LCD controller and the LED turn-on circuit (none of them shown in FIG. 6) are all integrated on a single IC chip (not shown). The A/D converter circuit, the n-speed field sequential color signal generation circuit, the LCD controller and the LED turn-on circuit may be formed integral with the LCD.

Figure 8A:
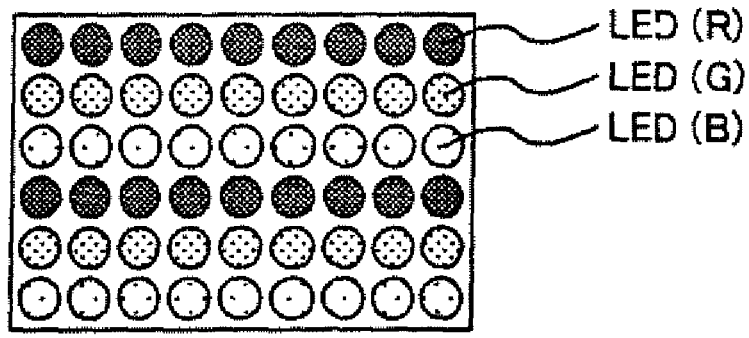
FIG. 8 is a schematic diagram showing an LED backlight used in one embodiment of a HMD using the driving method of the invention.

FIG. 8 shows the structures of the LED backlights 609-L and 609-R of the HMD of this embodiment. FIG. 8A shows the striped arrangement of the LED(R) (red LED), the LED (G) (green LED) and the LED(B) (blue LED) that together form the LED backlights 609-L and 609-R. This embodiment employs the LED arrangement as shown in FIG. 8A.

Figure 8B:
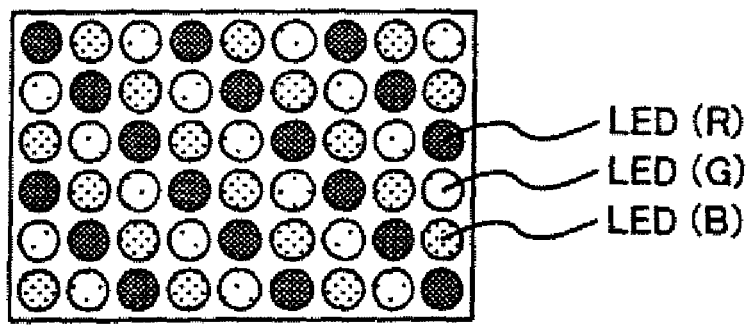
Figure 8C:
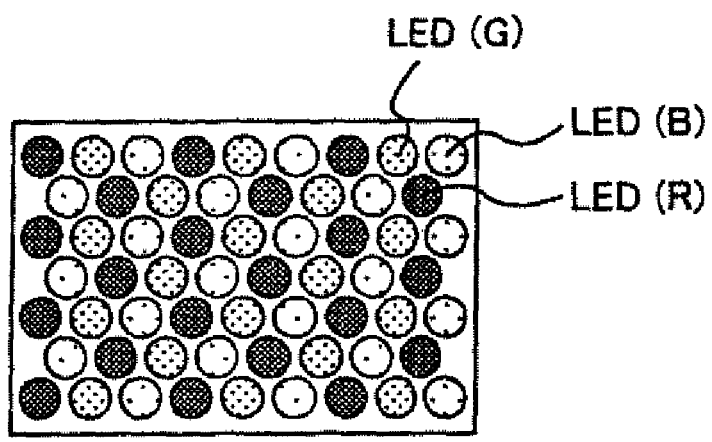

The LEDs making up the LED backlights 609-L and 609-R may be so arranged that the three LED colors are staggered from one row to another as shown in FIG. 8B. Further, as shown in FIG. 8C, the LEDs may be arranged densely so that as many LEDs as possible can be arranged in the backlights.

(Embodiment 3)

Figure 9:
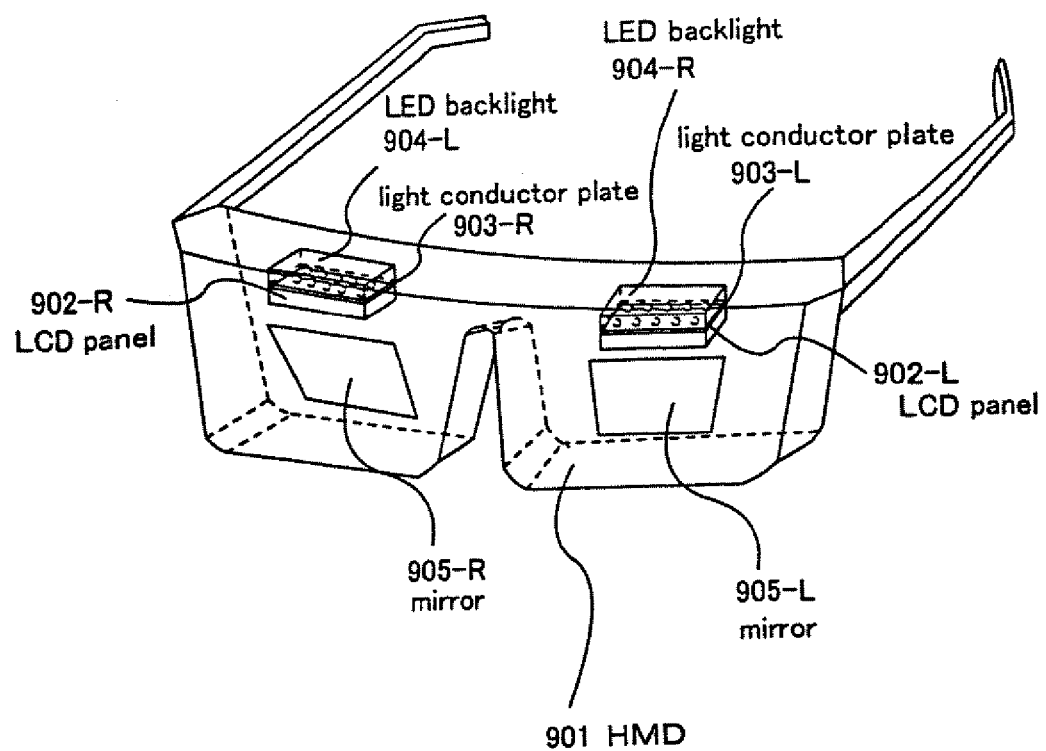
FIG. 9 is a schematic diagram showing the outline configuration of one embodiment of a HMD using the driving method of the invention.
Figure 10:
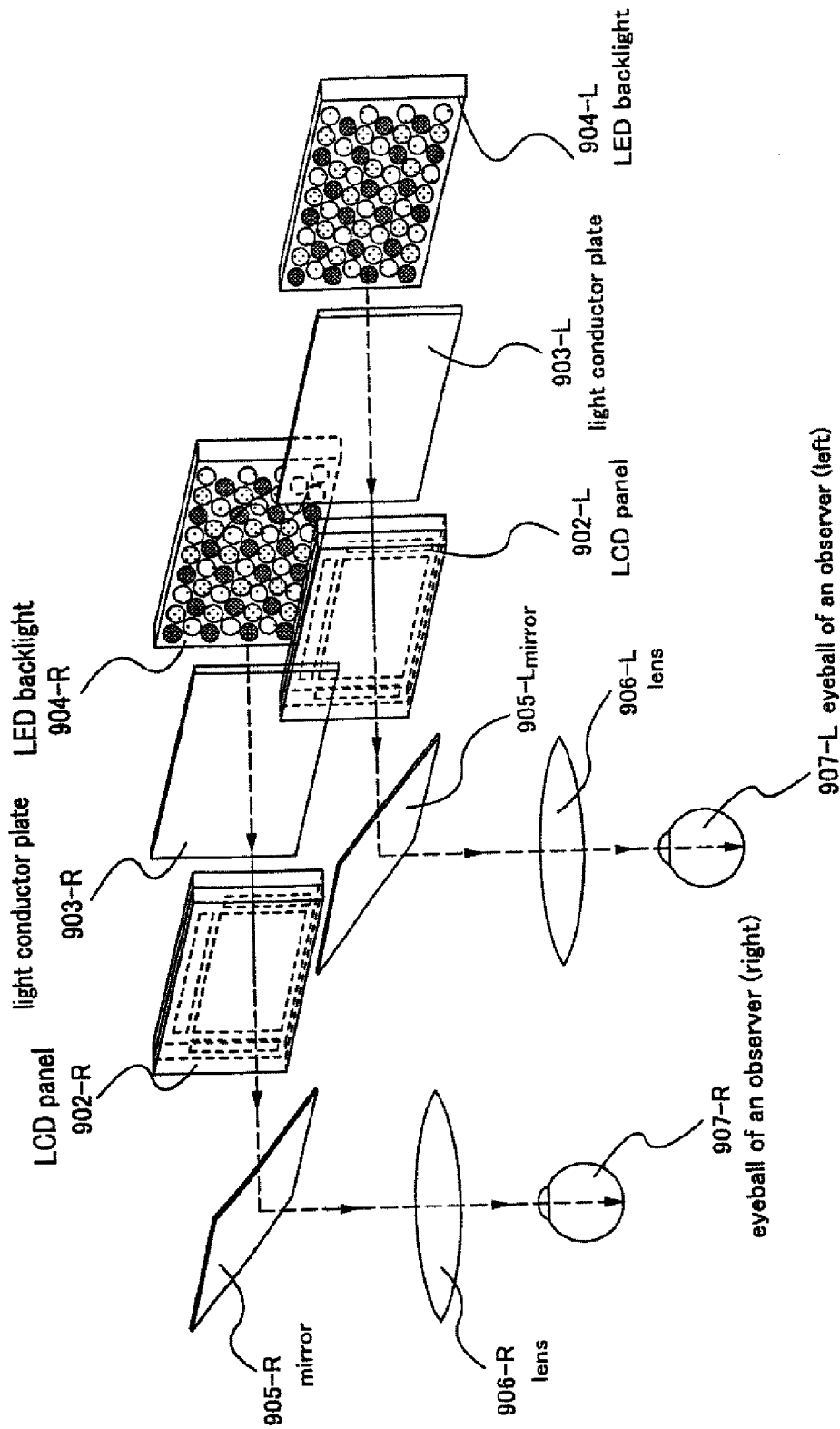
FIG. 10 is a schematic diagram showing the outline configuration of one embodiment of a HMD using the driving method of the invention.

Another HMD using the driving circuit of the invention will be explained in this embodiment by referring to FIGS. 9 and 10. FIG. 9 shows the outline structure of the HMD of this embodiment. Designated 901 is a HMD body; 902-R and 902-L are LCD panels; 903-R and 903-L are light conductor plates; 904-R and 904-L are LED backlights; and 905-R and 905-L are mirrors. 906-R and 906-L, though not shown in FIG. 9, are incorporated in the HMD 901. In FIG. 10, 906-R and 906-L are lenses and 907-L and 907-R are eyeballs of an observer.

In the HMD of this embodiment, the light from the LED backlights 904-R and 904-L is formed into plane-like geometries by the light conductor plates 903-R and 903-L and then thrown onto the LCD panels 902-R and 902-L. The light incident on the LCD panels 902-R and 902-L is optically modulated by the LCD panels 902-R and 902-L and thereby given image information. In this embodiment, too, a pair of polarizing plates (not shown) with their polarization axes crossing at right angles to each other are arranged on both sides of the LCD panels 902-R and 902-L. The light that was given image information by the LCD panels 902-R and 902-L is bent by mirrors 905-R and 905L, magnified by lenses 906-R and 906-L and then detected by the eyeballs 907-L and 907-R of an observer. The LCD panel 902-R and the LCD panel 902-L may offer the same image. It is also possible to provide different images on the LCD panel 902-R and on the LCD panel 902-L so that the observer can recognize a three-dimensional image.

The MD of this embodiment is supplied video signals from the external video signal source (not shown). The HMD of this embodiment has a construction as shown in FIG. 4. In this embodiment, the A/D converter circuit, the n-speed field sequential color signal generation circuit, the LCD controller and the LED turn-on circuit (none of them shown in FIGS. 9 and 10) are all integrated on a single IC chip (not shown). The A/D converter circuit, the n-speed field sequential color signal generation circuit, the LCD controller and the LED turn-on circuit may be formed integral with the LCD.

(Embodiment 4)

Figure 11:
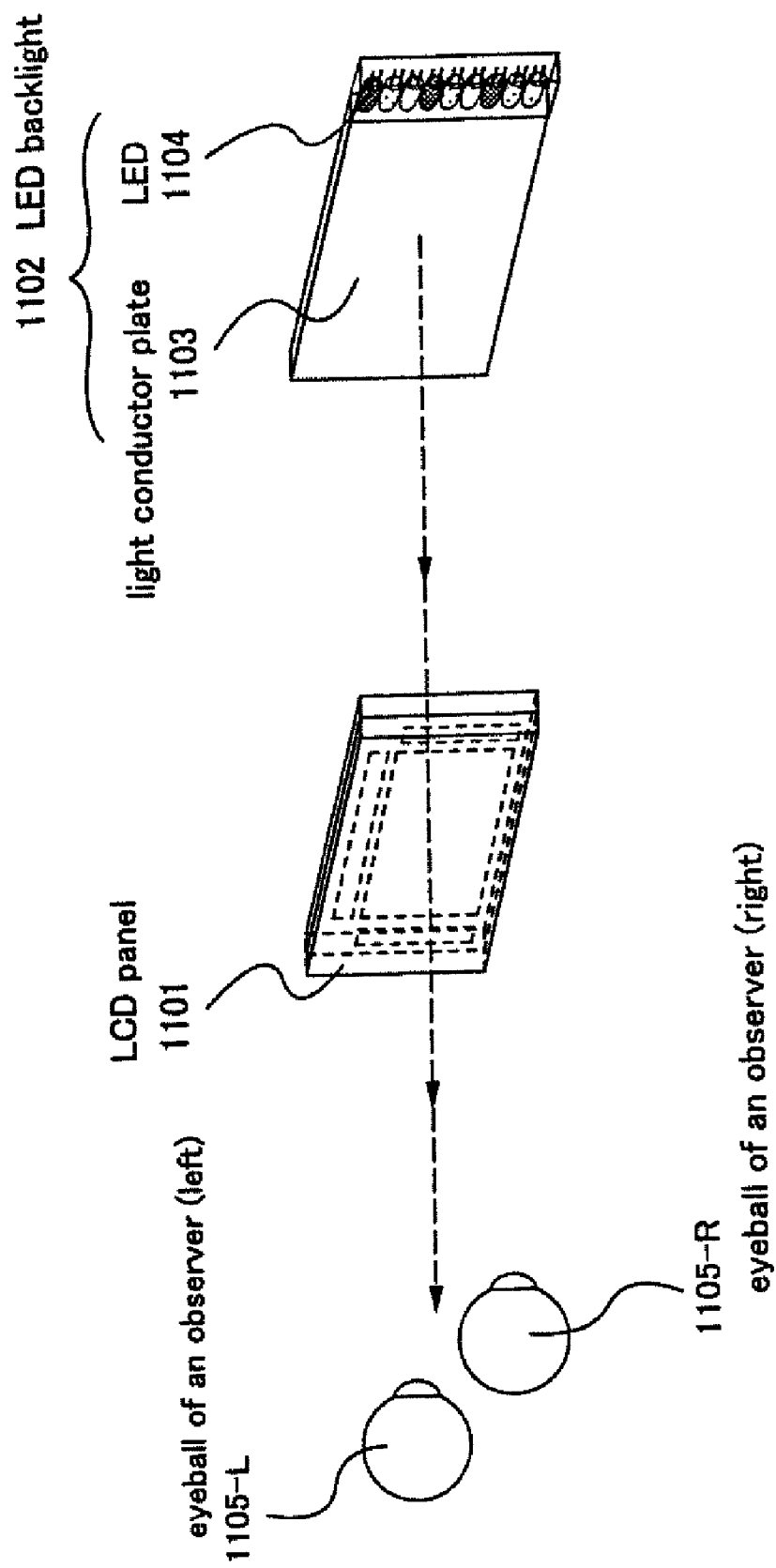
FIG. 11 is a schematic diagram showing the outline configuration of one embodiment of a liquid crystal display using the driving method of the invention.

Let us turn to FIG. 11. This embodiment differs from the preceding embodiments in the construction of the LED backlight. The liquid crystal display of this embodiment has an LCD panel 1101 and an LED backlight 1102. The LED backlight 1102 has a light conductor plate 1103 and an LED 1104. The LED 1104 throws light from the side of the LED backlight. The light is then formed into planar light that is then shone onto the LCD panel 1101. Denoted 1105-L and 1105-R are left and right eyeballs of an observer.

(Embodiment 5)

Figure 12:
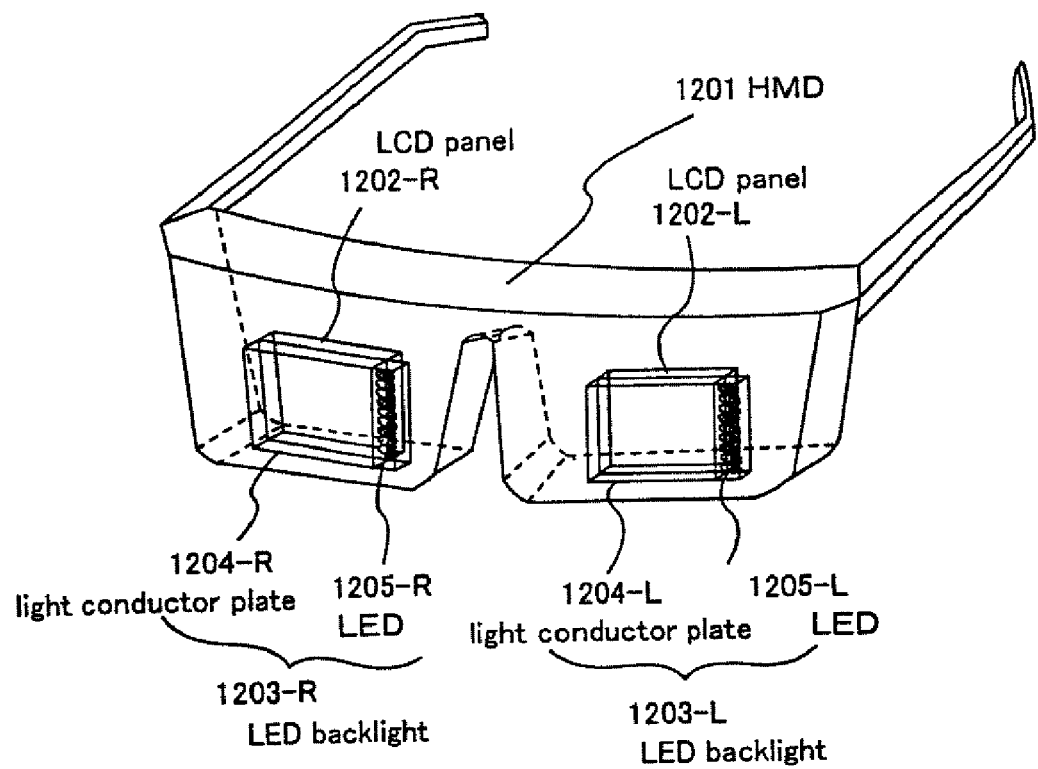
FIG. 12 is a schematic diagram showing the outline configuration of one embodiment of a HMD using the driving method of the invention.
Figure 13:
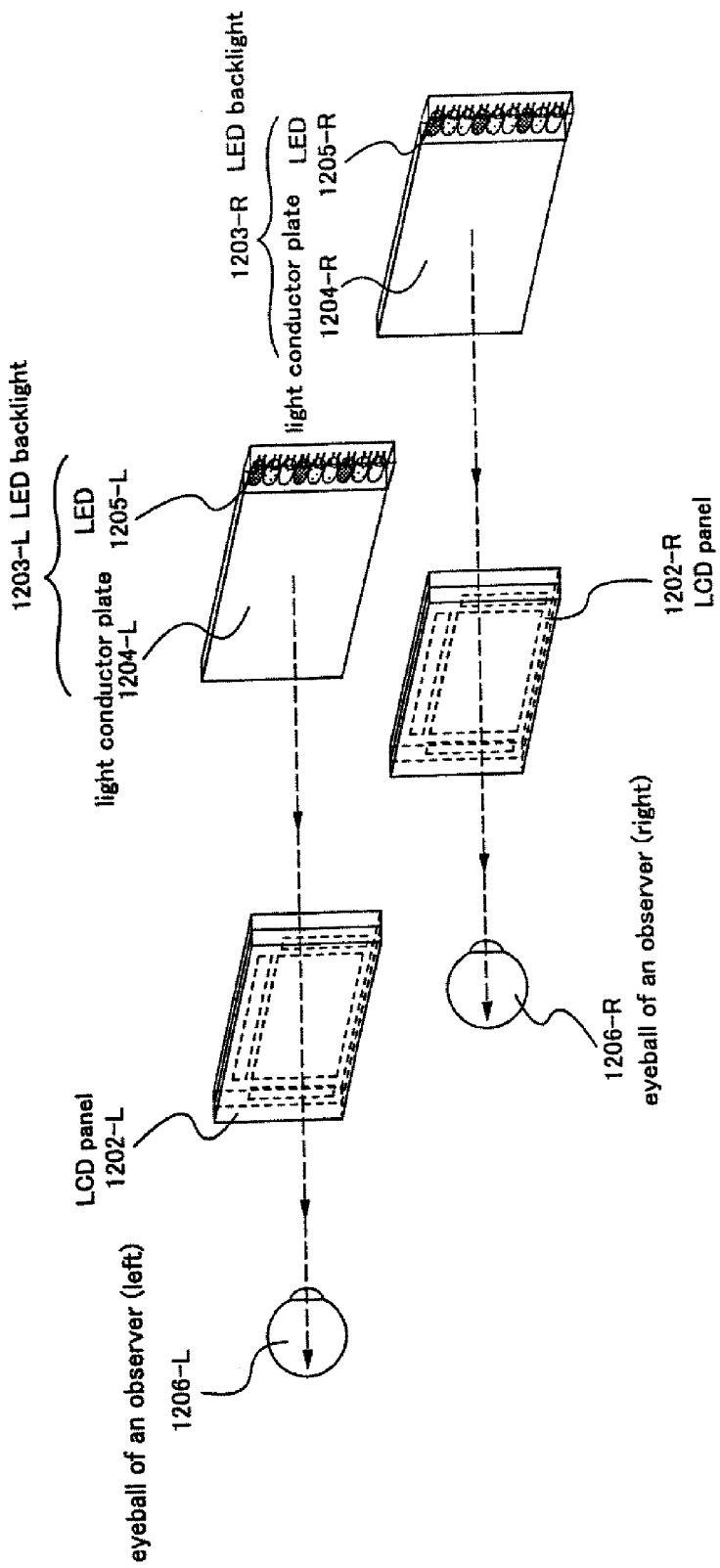
FIG. 13 is a schematic diagram showing the outline configuration of one embodiment of a HMD using the driving method of the invention.

In this embodiment we will explain about a HMD using an LED backlight described in the preceding embodiment 4 by referring to FIGS. 12 and 13. Reference number 1201 represents a HMD body; 1202-R and 1202-L are LCD panels; and 1203-R and 1203-L are LED backlights. The LED backlights 1203-R and 1203-L each have a conductor plate 1204-R, 1204-L and an LED 1205-R, 1205-L. 1206-L and 1206-R are left and right eyeballs of an observer.

(Embodiment 6)

The method of manufacturing the LCD panel used in the preceding embodiments 1-5 will be explained. In this embodiment, FIGS. 15-18 show an example case of forming a plurality of TFTs on a substrate having an insulating surface and fabricating a pixel matrix circuit, a driving circuit, a logic circuit, etc. in a monolithic structure. This embodiment shows how one of pixels in the pixel matrix circuit and a CMOS circuit, a basic circuit of other circuits (driving circuit, logic circuit, etc.) are formed simultaneously. It is also possible to form the A/D converter circuit, the n-speed field sequential color signal generation circuit, the LCD controller and the LED turn-on circuit integrally with the LCD. While this embodiment describes a fabrication process in a case where the P-channel TFT and N-channel TFT in the CMOS circuit each have a gate electrode, it is also possible to fabricate a CMOS circuit which comprises TFTs having a plurality of gate electrodes, such as double gate type and triple gate type. Further, although this embodiment employs double gate N-channel TFTs for the pixel TFTs, it is possible to use single gate or triple gate TFTs.

Figure 15A:
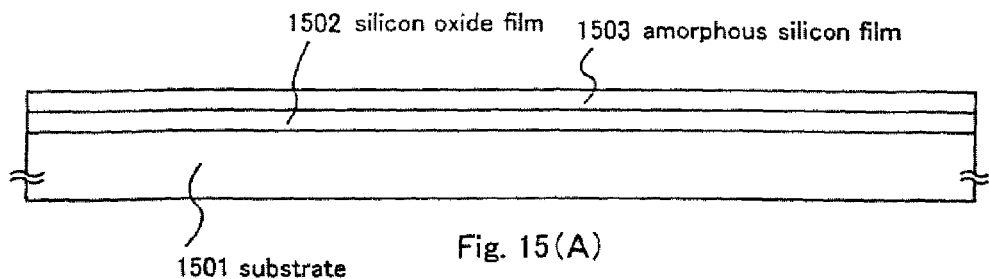
FIG. 15 is a schematic diagram showing an example of method of manufacturing an LCD panel used in the liquid crystal display using the driving method of the invention.

See FIG. 15A. First, a quartz substrate 1501 as a substrate with an insulating surface is prepared. Instead of the quartz substrate, a silicon substrate formed with a thermal oxide film may be used. An amorphous silicon film may also be formed temporarily over the quartz substrate and completely thermally oxidized to form an insulating film. It is also possible to use a quartz substrate, a ceramic substrate or a silicon substrate formed with a silicon nitride film as an insulating film. Next, a base film 1502 is formed. In this embodiment, a silicon oxide ($SiO_2$) 200 nm thick was used as the base film 1502. Then, an amorphous silicon film 1503 is formed. The amorphous silicon film 1503 is adjusted so that its final thickness (considering a reduction in thickness after thermal oxidation) will be 10-75 nm (preferably 15-45 nm).

In forming the amorphous silicon film 1503 it is important to perform strict control on impurity concentration in the film. In this embodiment the impurity concentration in the amorphous silicon film 1503 is controlled so that the concentrations of C (carbon) and N (nitrogen), impurities that hinder crystallization occurring at a later stage, will both be less than $5 \times 10^{18}$ atoms/cm$^3$ (typically $5 \times 10^{17}$ atoms/cm$^3$ or less, preferably $2 \times 10^{17}$ atoms/cm$^3$ or less) and that the concentration of O (oxygen) will be less than $1.5 \times 10^{19}$ atoms/cm$^3$ (typically $1 \times 10^{18}$ atoms/cm$^3$ or less, preferably $5 \times 10^{17}$ atoms/cm$^3$ or less). If these impurities exist in concentrations higher than those shown above, the crystallization at a later stage will be adversely affected, degrading the quality of film after crystallization. In this specification, the concentrations of the above impurity elements are defined by the minimum values of the measurements by SIMS (secondary ion mass spectrometry).

To obtain the above construction, it is preferred that the low pressure thermal CVD furnace used in this embodiment be dry-cleaned periodically to keep the deposition chamber clean. The dry cleaning may be done by supplying 100-300 sccm of chlorine fluoride ($ClF_3$) into the furnace heated to around 200-400° C. to clean the deposition chamber with fluorine generated by thermal decomposition.

According to the findings of this applicant, with the in-furnace temperature set at 300° C. and the $ClF_3$ gas flow set at 300 sccm, it is possible to completely remove adhering substances (mainly comprised of silicon) about 2 μm thick in four hours.

The concentration of hydrogen in the amorphous silicon film 1503 is also a very important parameter and it seems that a smaller hydrogen content will produce a film with better crystallinity. Thus, the formation of the amorphous silicon film 1503 should preferably be done by the low pressure thermal CVD method. A plasma CVD method can also be used by optimizing the deposition conditions.

Next, the process of crystallizing the amorphous silicon film 1503 is performed by using a technology disclosed in JP-A-7-130652 as a crystallization means. Whichever means in the Patent Publication, embodiment 1 or embodiment 2, may be employed. In this embodiment the technology described in the embodiment 2 of the Patent Publication (detailed in JP-A-8-78329) is preferably used.

Figure 15B:
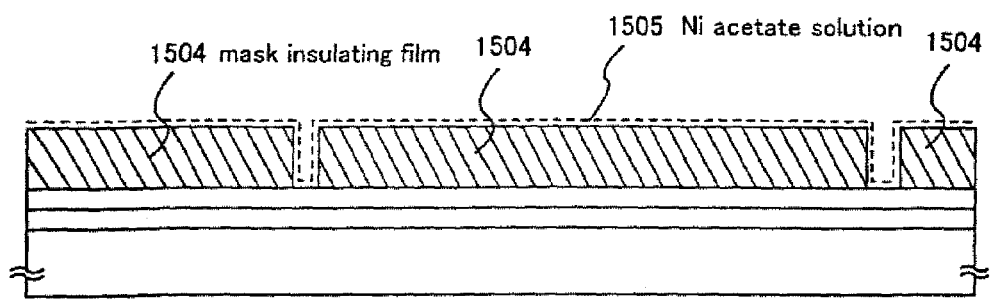
Figure 15C:
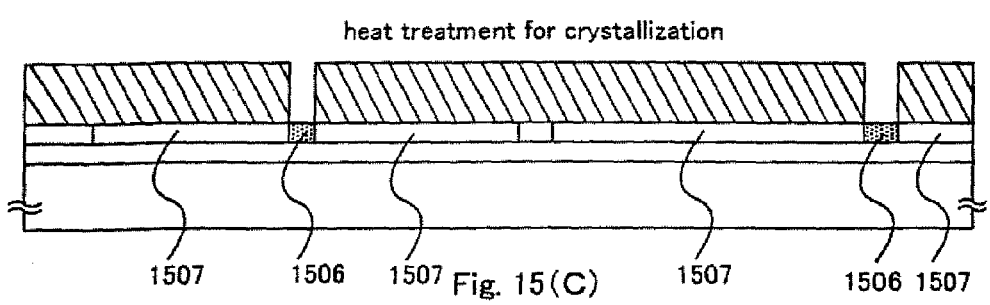

The technology described in JP-A-8-78329 first forms a mask insulating film 1504, used to select catalytic element addition regions, to a thickness of 150 nm. The mask insulating film 1504 has a plurality of openings through which to add catalytic elements. The locations of crystallization regions can be determined by the locations of the openings (FIG. 15B).

Then, a solution (nickel acetate ethanol solution) 1505 containing nickel (Ni) as a catalytic element for promoting crystallization of the amorphous silicon film 1503 is spin-coated over the film. Other possible catalytic elements include cobalt (Co), iron (Fe), palladium (Pd) germanium (Ge) platinum (Pt), copper (Cu) and gold (Au) (FIG. 15B).

The catalytic element addition process described above may use an ion implantation or plasma doping method using a resist mask. In this case, because reduction in the area of the catalytic element addition regions and the control of a growth distance in the horizontal growth region are facilitated, this technology is effective in fabricating miniaturized circuits.

After the catalytic element addition process is finished, the substrate is heated at 450° C. for about an hour to remove hydrogen and is then heat-treated at 500-960° C. (typically 550-650° C.) in the presence of an inert gas, hydrogen or oxygen for 4-24 hours to crystallize the amorphous silicon film 1503. In this embodiment, the heat treatment is performed in the presence of nitrogen at 570° C. for 14 hours.

In this process, the crystallization of the amorphous silicon film 1503 proceeds preferentially at nuclei generated in the nickel-added regions 1506 to form crystal regions 1507 which are made of a polycrystalline silicon film that has grown almost parallel to the surface of the substrate 1501. This crystal region 1507 is called a horizontal growth region. The horizontal growth region has individual crystals aggregated in relatively aligned state and thus has an advantage of excellent overall crystallinity.

Rather than using the mask insulating film 1504, it is possible to apply the nickel acetate solution to the surface of the amorphous silicon film.

Figure 15D:
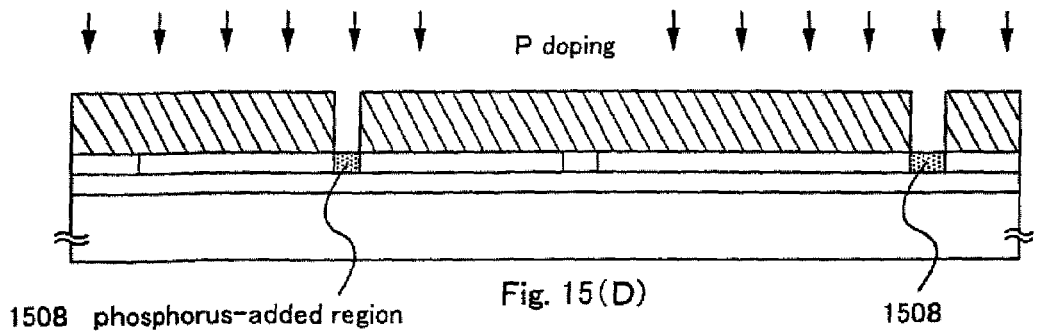

Referring to FIG. 15D, the next process to be performed is the gettering of the catalytic elements. First, phosphorus ions are selectively doped. With the mask insulating film 1504 formed, phosphorus is doped. Phosphorus is only doped into areas 1508 not covered with the polysilicon mask insulating film 1504 (these areas are called phosphorus-added regions 1508). At this time, the dopant acceleration voltage and the thickness of the mask made of oxide film are optimized so that phosphorus will not pierce through the mask insulating film 1504. The mask insulating film 1504 is not necessarily an oxide film, but the oxide film is advantageous as it does not cause contamination even when it contacts an active layer.

The dose of phosphorus is preferably in the range of $1 \times 10^{14}$ to $1 \times 10^{15}$ ions/cm$^2$. In this embodiment, a dose of $5 \times 10^{14}$ ions/cm$^2$ is doped by using an ion doping apparatus.

The dopant acceleration voltage selected was 10 keV, at which level phosphorus can hardly pass through the mask insulating film with a thickness of 150 nm.

Figure 15E:
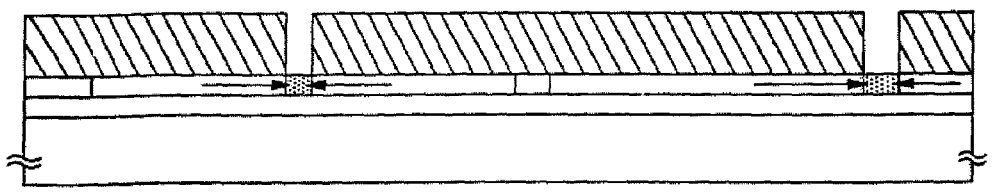

In FIG. 15E, the substrate is annealed in the presence of nitrogen at 600° C. for 1-12 hours (in this embodiment, 12 hours) to perform the gettering of nickel element. This causes nickel atoms to be attracted to phosphorus as shown by the arrow in FIG. 15E. At the temperature of 600° C., while phosphorus atoms hardly move in the film, nickel atoms can move a distance of several hundred μm or more. This shows that phosphorus is one of the most suited elements for gettering.

Figure 16A:
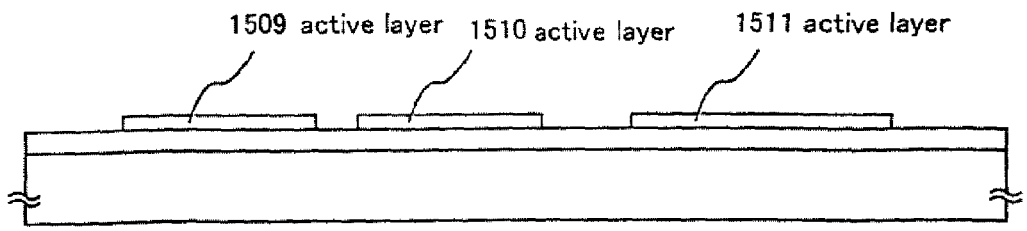
FIG. 16 is a schematic diagram showing an example of method of manufacturing an LCD panel used in the liquid crystal display using the driving method of the invention.

Next, by referring to FIG. 16A, the process of patterning a polysilicon film will be explained. In this process, steps are taken to ensure that the phosphor-added regions 1508, where nickel atoms were gettered, do not remain. In this way, active layers 1509-1511 of a polysilicon film that hardly contain nickel element were obtained. The active layer of polysilicon films 1509-1511 thus obtained will at later stage form a TFT active layer.

Figure 16B:
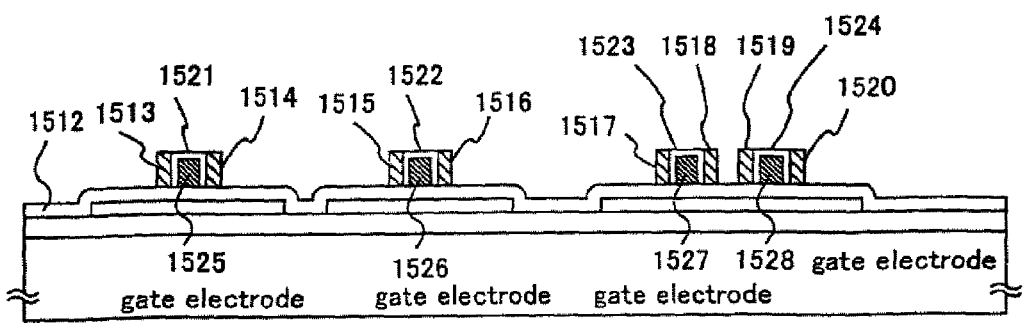

In FIG. 16B, after the active layers 1509-1511 are formed, a gate insulating film 1512 comprising silicon is formed over the active layers to a thickness of 70 nm. Then, in the presence of an oxidizing atmosphere the substrate is heat-treated at 800-1100° C. (preferably 950-1050° C.) to thermally oxidize an interface between the active layers 1509-1511 and the gate insulating film 1512.

The heat treatment for the gettering of the catalytic element (catalytic element gettering process) may be performed at this stage. In that case, the heat treatment is done by using a processing gas containing a halogen element to utilize the catalytic element gettering effect by the halogen element. To produce a sufficient gettering effect by the halogen element, it is preferred that the heat treatment be performed at temperatures in excess of 700° C. Below this temperature the decomposition of halides in the processing gas becomes difficult, raising the possibility of a failure to produce the gettering effect. Among the gases containing halogen elements are typically one or more kinds chosen from halogen containing compounds such as HCl, HF, $NF_3$, HBr, $Cl_2$, $ClF_3$, $BCl_2$, $F_2$, and $Br_2$. During this process, when HCl is used for example, nickel in the active layer is gettered by the action of chlorine and is considered to be removed and released as a volatile nickel chloride into the air. When the catalytic elements are to be gettered by halogen elements, the catalytic element gettering process may be performed after the mask insulating film 1504 is removed and before the active layer is patterned. The catalytic element gettering process may be performed after the active layer has been patterned. Either of these gettering processes may be combined.

Next, a metal film made mainly of aluminum, not shown, is deposited and patterned to form a prototype of the gate electrode described later. In this embodiment, an aluminum film containing 2 wt % of scandium is used.

The gate electrode may also be formed of a polysilicon film doped with an impurity to give the film a certain type of conductivity.

Next, porous anodic oxide films 1513-1520, non-porous anodic oxide films 1521-1524 and gate electrodes 1525-1528 are formed by the technology described in JP-A-7-135318 (FIG. 16B).

Figure 16C:
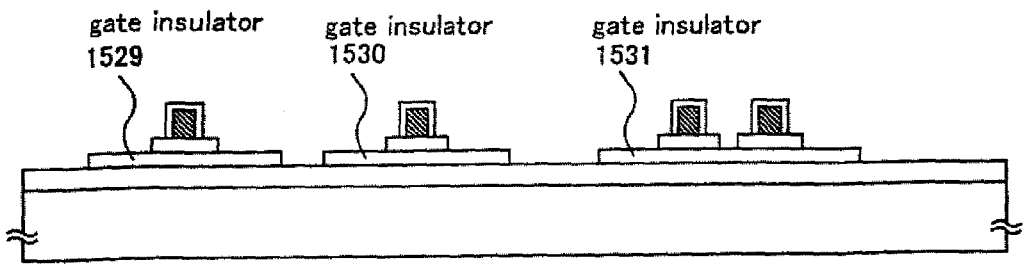

When the state of FIG. 16B is obtained, the gate insulating film 1512 is etched with the gate electrodes 1525-1528 and porous anodic oxide films 1513-1520 as masks. Then, the porous anodic oxide film 1513-1520 are removed to produce the state of FIG. 16C. In FIG. 16C, shown at 1529-1531 are gate insulating films after being processed.

Figure 17A:
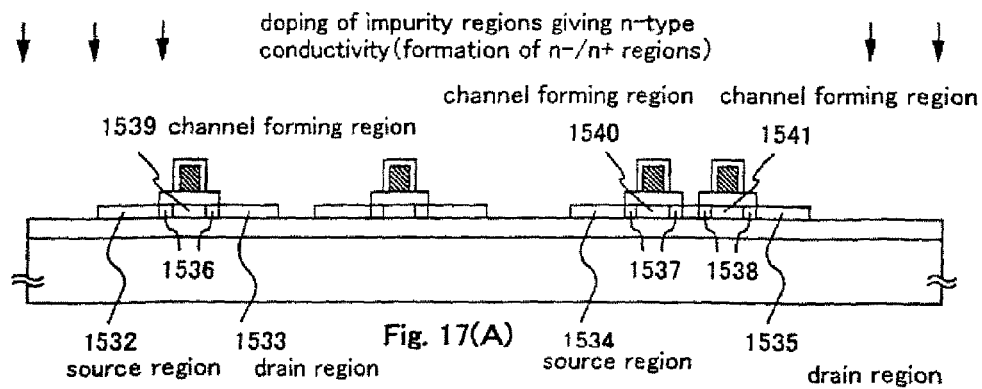
FIG. 17 is a schematic diagram showing an example of method of manufacturing an LCD panel used in the liquid crystal display using the driving method of the invention.

Next, in FIG. 17A, a process of adding an impurity element to give one type of conductivity is performed. The impurity element used is P (phosphorus) or As (arsenic) for N-channel type and B (boron) or Ga (gallium) for P-channel type.

In this embodiment, the addition of impurities to form N-channel or P-channel TFTs is performed in two processes.

First, an impurity is doped to form N-channel TFTs. The first impurity addition (in this embodiment, phosphorus (P) is used) is done at a high acceleration voltage of about 80 keV to form n⁻ regions. The ion doping is adjusted so that the P ion concentration in the n⁻ regions will be $1\times10^{18}$ atoms/cm³ to $1\times10^{19}$ atoms/cm³.

The second impurity doping is done at a low acceleration voltage of about 10 keV to form n⁺ regions. Because the acceleration voltage is low this time, the gate insulation film works as a mask. The ion doping is adjusted so that the n⁺ regions will have a sheet resistance of 500Ω or less (preferably 300Ω or less).

With these processes finished, N-channel TFT source and drain regions 1532 and 1533, a low concentration impurity region 1536 and a channel formation region 1539, all constituting a CMOS circuit, are formed. Further, N-channel TFT source and drain regions 1534 and 1535, a low concentration impurity region 1537 and channel formation regions 1540 and 1514, all constituting the pixel TFT, are also formed (FIG. 17A).

In the state shown in FIG. 17A, the active layer of the P-channel TFT that forms the CMOS circuit has the same structure as the active layer of the N-channel TFT.

Figure 17B:
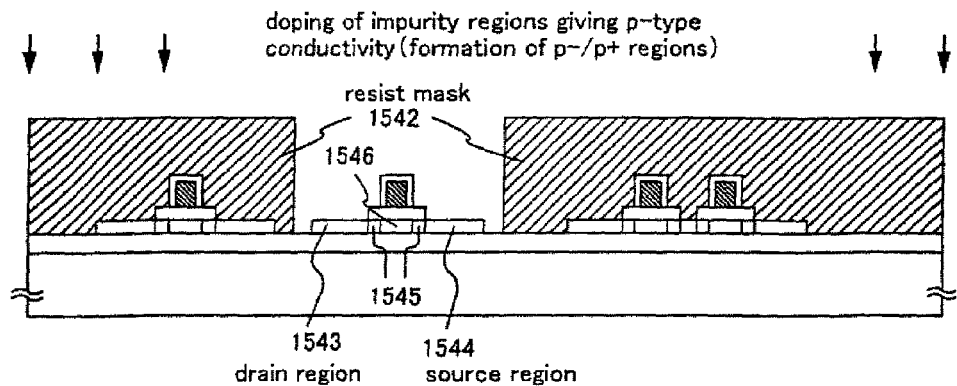

Then, as shown in FIG. 17B, with the N-channel TFTs covered with a resist mask 1542, an impurity ion for giving P type conductivity (in this embodiment, boron) is doped.

This process is performed in two steps as in the preceding impurity doping process. Because the N-channel type must be inverted to the P-channel type, the boron (B) ion in a concentration a few times higher than that of the P ion used in the preceding process is doped.

In this way, P-channel TFT's source and drain regions 1543 and 1544, a low concentration impurity region 1545, and a channel formation region 1546, all making up the CMOS circuit, are formed (FIG. 17B).

When a polysilicon film doped with an impurity to give it a certain type of conductivity is used to form a gate electrode, the low concentration impurity regions may be formed by using the known sidewall structure.

Next, impurity ions are activated by a combination of furnace anneal, laser anneal, lamp anneal, etc. At the same time, damages to the active layer sustained during the impurity doping process are repaired.

Figure 17C:
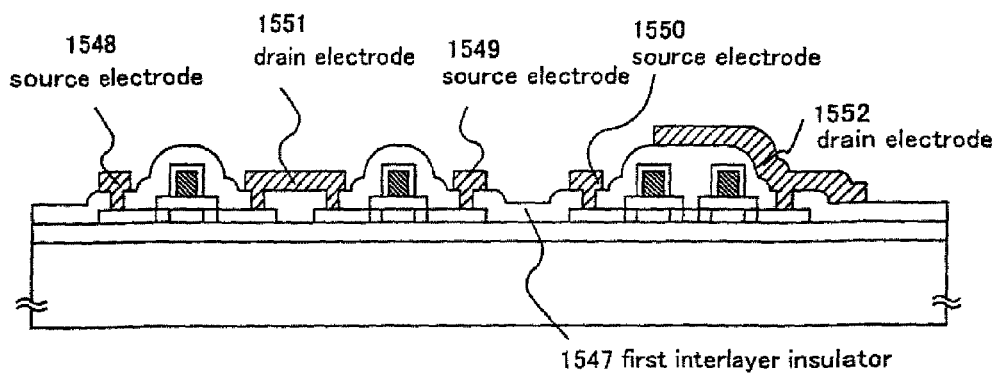

Next, in FIG. 17C, a laminated layer consisting of a silicon oxide film and a silicon nitride film is formed as a first interlayer insulating film 1547, which is then formed with contact holes and source and drain electrodes 1548-1552 are formed. The first interlayer insulating film 1547 may use an organic resin film.

Figure 18A:
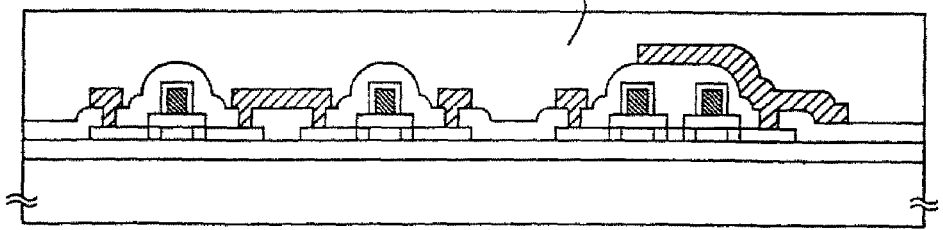
FIG. 18 is a schematic diagram showing an example of method of manufacturing an LCD panel used in the liquid crystal display using the driving method of the invention.

Next, in FIG. 18, a second interlayer insulating film 1553 made of organic resin film is formed to a thickness of 0.5-3 μm. Among the possible organic resin films are polyimide, acrylics and polyimideamide. The advantages of the organic resin film include the ease with which the film is formed, ease with which the film thickness can be increased, a low parasitic capacitance achieved by a low relative dielectric constant, and an excellent flatness. An organic resin film other than those listed above may also be used.

Next, a part of the second interlayer insulating film 1553 is etched away. Over the drain electrode 1552 of the pixel TFT a black matrix 1554 is formed with the second interlayer insulating film interposed. This embodiment used titanium (Ti) for the black matrix 1554. In this embodiment, an auxiliary capacitance is formed between the pixel TFT and the black mask.

Next, a contact hole is formed in the second interlayer insulating film 1553 and a pixel electrode 1556 is formed to a thickness of 120 nm. Because this embodiment is a transmission type active matrix liquid crystal display, a transparent conductive film such as ITO is used as a conductive film forming the pixel electrode 1556.

Then, the entire substrate is heated in the presence of hydrogen at 350° C. for 1-2 hours to hydrogenate the entire element to make up for the dangling bonds in the film (particularly in the active layer). With the above processes finished, an active matrix substrate having the CMOS circuit and the pixel matrix circuit on the same substrate is completed.

Next, the process of fabricating an active matrix liquid crystal display using the active matrix substrate manufactured in the above process will be described.

Figure 18B:
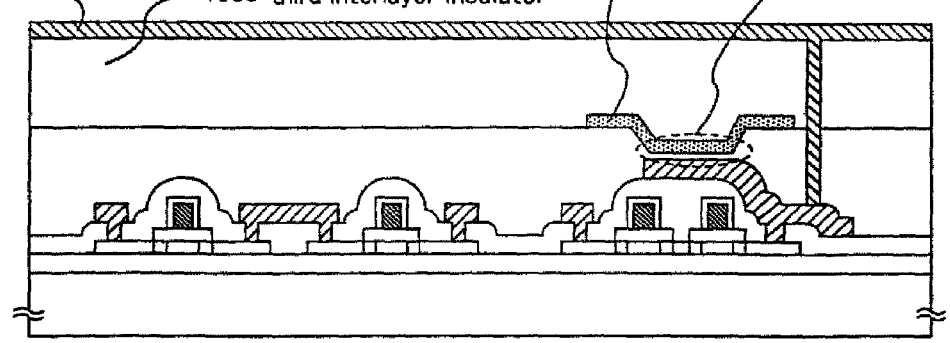

An alignment layer 1557 is formed over the active matrix substrate of FIG. 18B. This embodiment used polyimide for the alignment layer 1557. Then, a counter substrate is prepared. The counter substrate consists of a glass substrate 1558, a counter electrode 1559 made of a transparent conductive film, and an alignment layer 1560.

This embodiment used a polyimide film for the alignment layer. The alignment layer, after being formed, is subjected to a rubbing processing.

After these steps, the active matrix substrate and the counter substrate are bonded together by a known cell forming process using sealing material and spacers (none of them shown). Then, a ferroelectric liquid crystal 1561 mixed with a few percent of photocurable liquid crystal acrylate monomer is injected between these substrates and completely sealed with a sealant (not shown). Ultraviolet light was radiated while applying voltage to the liquid crystal to photopolymerize the liquid crystal acrylate monomer.

Figure 18C:
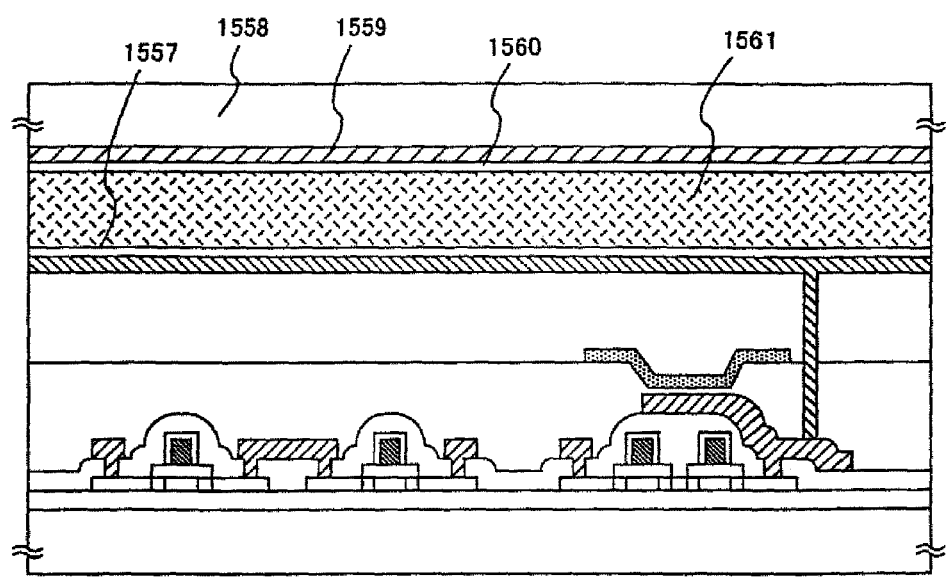

This completes a transmission type liquid crystal display as shown in FIG. 18C.

Instead of using the amorphous silicon film crystallization method described in this embodiment, it is possible to crystallize the amorphous silicon film by a laser beam (typically excimer laser beam).

(Embodiment 7)

This embodiment describes a liquid crystal display using inverse stagger type TFTs as the liquid crystal display capable of realizing the driving method of this invention.

FIG. 19 shows a cross section of an inverse stagger type N-channel TFT that forms the liquid crystal display of this embodiment. Although only one N-channel TFT is shown in FIG. 19, it is needless to say that the CMOS circuit can also be formed by using a P-channel TFT and an N-channel TFT, as in the case of the embodiment 6.

Denoted 1901 is a substrate like the one used in the embodiment 6. Designated 1902 is a silicon oxide film. Reference number 1903 represents a gate electrode; 1904 is a gate insulating film; and 1905, 1906, 1907 and 1908 are active layers of polysilicon film. In manufacturing these active layers, a method similar to the amorphous silicon film polycrystallization method explained in the embodiment 6 was used. It is also possible to crystallize the amorphous silicon film by a laser beam (preferably a linear laser beam or planar laser beam). Designated 1905 is a source region, 1906 is a drain region, 1907 is a low concentration impurity region (LDD region), and 1908 is a channel formation region. Reference number 1909 denotes a channel protective film, 1910 is an interlayer insulating film, and 1911 and 1912 are a source electrode and a drain electrode, respectively.

(Embodiment 8)

This embodiment describes a liquid crystal display comprising inverse stagger type TFTs whose configuration is different from that of the embodiment 7.

FIG. 20 shows a cross section of an inverse stagger type N-channel TFT that forms the liquid crystal display of this embodiment. Although only one N-channel TFT is shown here, too, it is needless to say that the CMOS circuit can also be formed by using a P-channel TFT and an N-channel TFT, as in the case of the embodiment 6. It should also be noted that the pixel TFT, too, can be formed in the similar construction.

Denoted 2001 is a substrate like the one used in the embodiment 6. Designated 2002 is a silicon oxide film. Reference number 2003 represents a gate electrode and 2004 is a benzocyclobutane (BCB) film whose upper surface is planarized. 2005 is a silicon nitride film. The BCB film and the silicon nitride film together form the gate insulating film. 2006, 2007, 2008 and 2009 represent active layers of polysilicon film. In manufacturing these active layers, a method similar to the amorphous silicon film polycrystallization method explained in the embodiment 1 was used. It is also possible to crystallize the amorphous silicon film by a laser beam (preferably a linear laser beam or planar laser beam). Designated 2006 is a source region, 2007 is a drain region, 2008 is a low concentration impurity region (LDD region), and 2009 is a channel formation region. 2010 is a channel protective film, 2011 an interlayer insulating film, and 2012 and 2013 are a source electrode and a drain electrode, respectively.

With this embodiment, because the gate insulating film comprising the BCB film and the silicon nitride film is planarized, the amorphous silicon film formed over the gate insulating film is also planar. Hence, in polycrystallizing the amorphous silicon film, it is possible to produce a polysilicon film more uniform than the conventional inverse stagger type TFT.

(Embodiment 9)

While the preceding embodiments concern the liquid crystal display using a ferroelectric liquid crystal, it is also possible to use a nematic liquid crystal.

Embodiment 10)

The field sequential liquid crystal display using the driving circuit of this invention has a wide range of applications. This embodiment describes semiconductor apparatus incorporating the field sequential liquid crystal display using the driving circuit of the invention.

Such semiconductor apparatus include video cameras, still cameras, projectors, HMDs, car navigation equipment, personal computers, and portable information terminals (such as mobile computers and cellular phones). An example of these apparatus is shown in FIGS. 21 and 24.

Figure 21A:
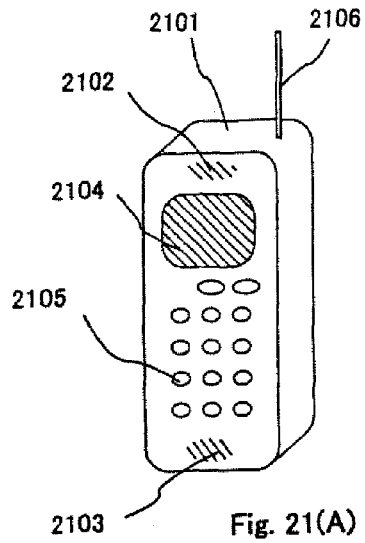
FIG. 21 shows outline views showing examples of semiconductor apparatus using the liquid crystal display using the driving method of the invention.

FIG. 21A shows a cellular phone, which comprises a body 2101, a voice output unit 2102, a voice input unit 2103, a field sequential liquid crystal display 2104, an operation switch 2105, and an antenna 2106.

Figure 21B:
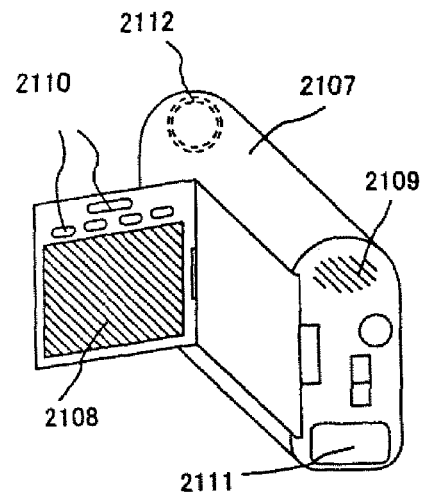

FIG. 21B shows a video camera, which comprises a body 2107, a field sequential liquid crystal display 2108, a voice input unit 2109, an operation switch 2110, a battery 2111, and an image receiving unit 2112.

Figure 21C:
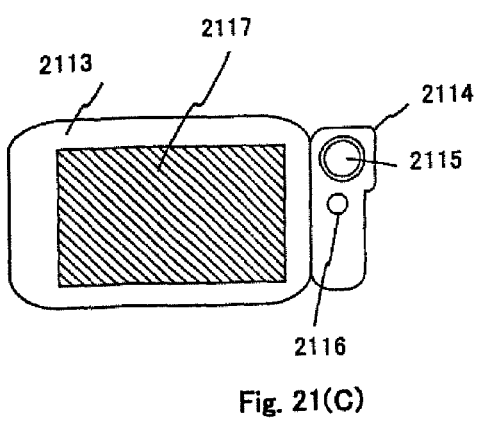

FIG. 21C shows a mobile computer, which comprises a body 2113, a camera unit 2114, an image receiving unit 2115, an operation switch 2116, and a field sequential liquid crystal display 2117.

Figure 21D:
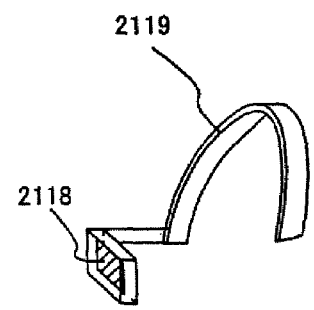
Figure 22:
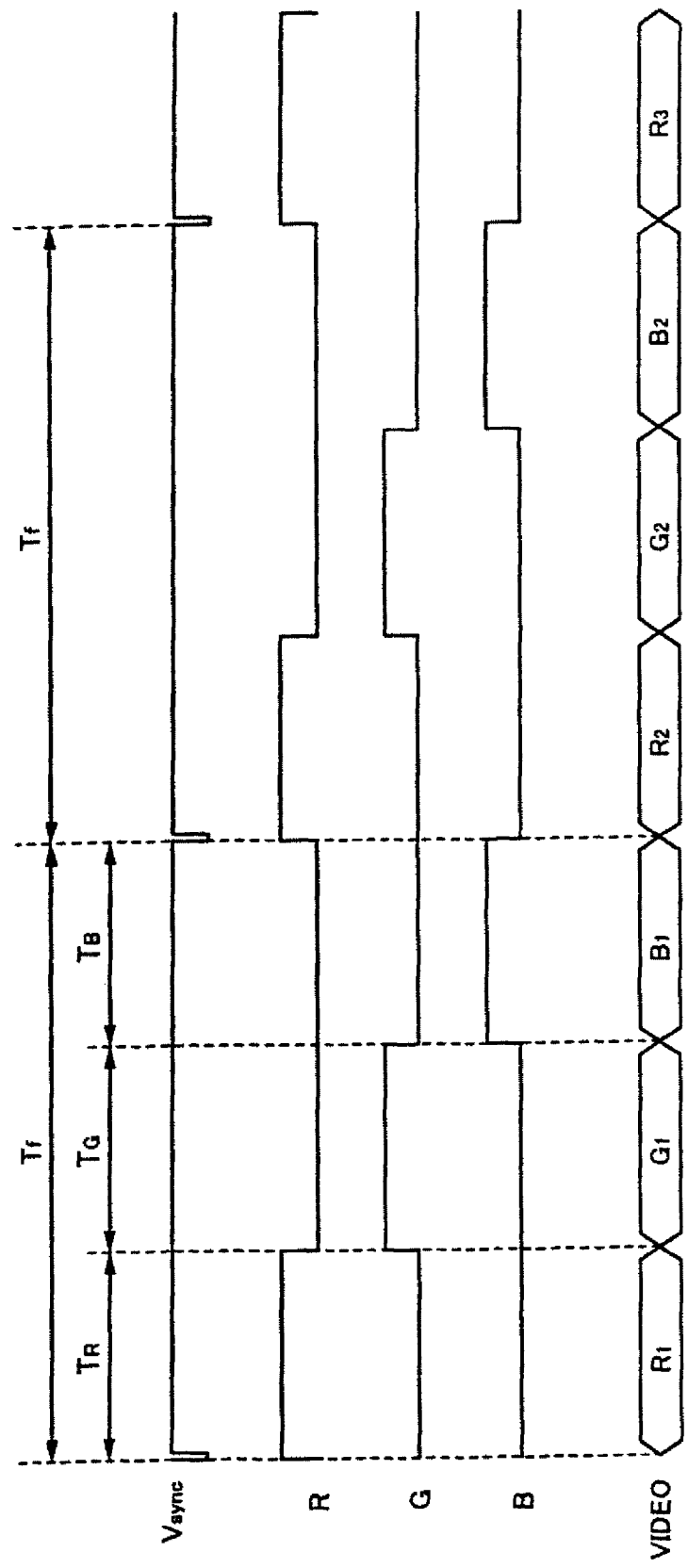
FIG. 22 is a timing chart for the conventional field sequential driving method.

FIG. 21D shows a HMD for one eye, which comprises a field sequential liquid crystal display 2118 and a band 2119.

Figure 24A:
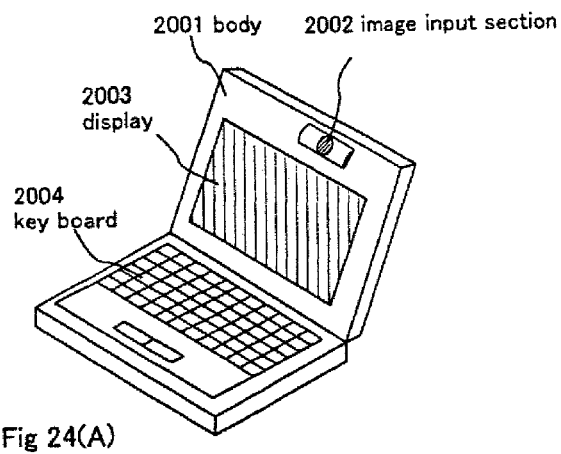
FIG. 24 shows outline views showing examples of semiconductor apparatus using the liquid crystal display using the driving method of the invention.

FIG. 24A shows a personal computer, which comprises a body 2001, an image input unit 2002, a field sequential liquid crystal display 2003, and a keyboard 2004.

Figure 24B:
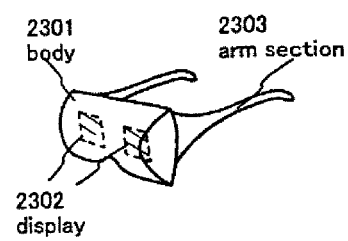

FIG. 24B shows a goggle type display, which comprises a body 2301, a field sequential liquid crystal display 2302, and arms 2303.

Figure 24C:
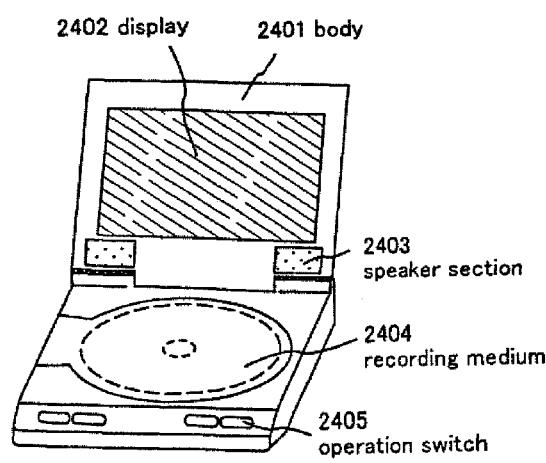

FIG. 24C shows a player using a recording medium recorded with a program (hereafter referred to as recording medium), which comprises a body 2401, a field sequential liquid crystal display 2402, a speaker unit 2403, a recording medium 2404 and an operation switch 2405.

Figure 24D:
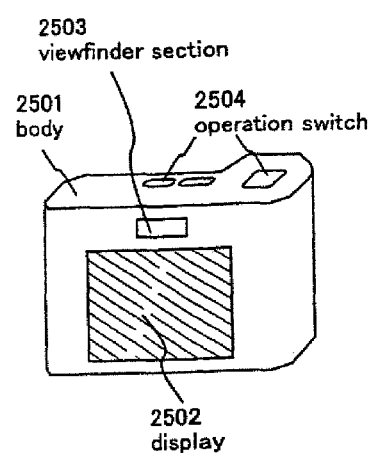

FIG. 24D shows a digital camera, which comprises a body 2501, a field sequential liquid crystal display 2502, an eyepiece 2503, an operation switch 2504, and an image receiver (not shown).

(Embodiment 11)

The field sequential liquid crystal display of the invention can use liquid crystals other than the ferroelectric liquid crystal described above. They include the liquid crystals described, for example, in "1998, SID, 'Characteristics and Driving Scheme of Polymer-Stabilized Monostable FLCD Exhibiting Fast Response Time and High Contrast Ratio with Gray-Scale Capability' by H. Furue et al."; in "1997, SID DIGEST, 841, 'A Full-Color Thresholdless Antiferroelectric LCD Exhibiting Wide Viewing Angle with Fast Response Time' by T. Yoshida et al."; in "1996, J. Mater. Chem. 6(4), 671-673, ' Thresholdless antiferroelectricity in liquid crystals and its application to displays' by S. Inui et al."; and in U.S. Pat. No. 5,594,569.

Figure 23A:
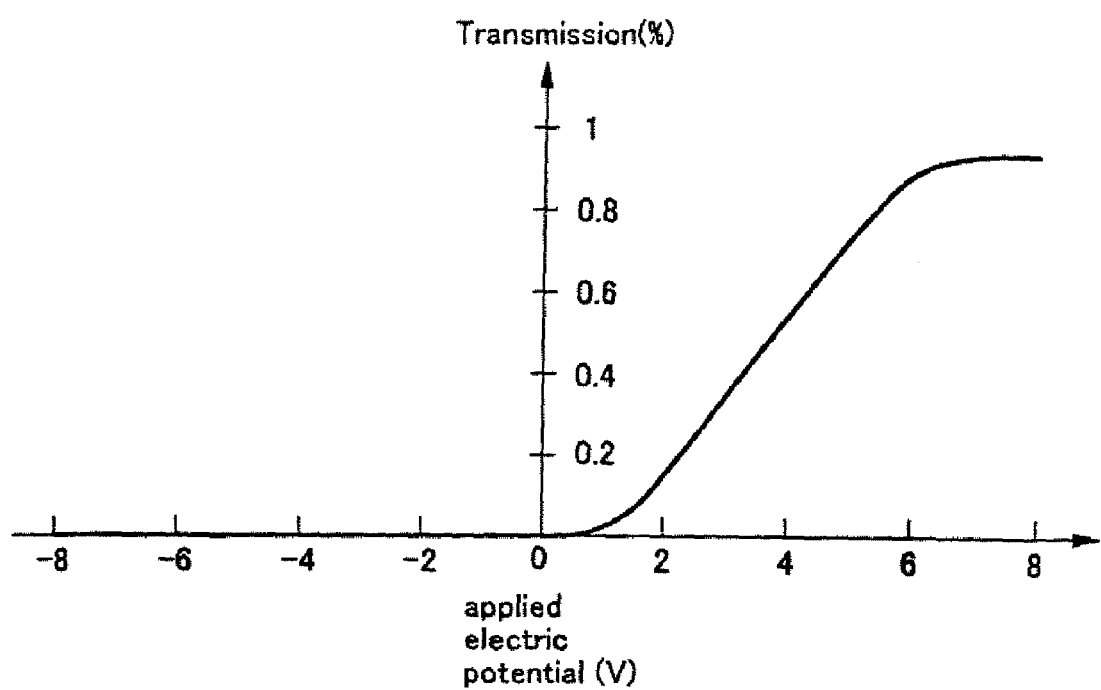
FIG. 23 is a graph showing an applied voltage-transmissivity characteristic of a thresholdless antiferroelectric mixed liquid crystal.

FIG. 23(A) shows the electrooptical characteristic of monostable ferroelectric liquid crystal (FLC) in which FLC that exhibits isotropic phase—cholesteric phase—chiral smectic C phase transition is used to cause transition from cholesteric phase to chiral smectic C phase by applying DC voltage, and the corn edge is substantially coincided with the rubbing axis. The display mode by FLC as shown in FIG. 23(A) is called "half V-shaped switching mode." The axis of ordinates in FIG. 23(A) represents transmittivity (arbitrary unit) and abcissas applied voltage. Regarding "half V-shaped switching mode", details are taught in references "Half V-shaped switching mode FLCD", Terada et al., Proceedings of 46th Spring Meetings of The Society for Applied Physics of Japan, p1316, March 1999, and "Time Divided Full Color LCD by FLC", Yoshihara, EKISHO 3(3), 1999, p190.

As shown in FIG. 23(A), low voltage driving and gray scale display is possible by using such mixed ferroelectric liquid crystals. FLC exhibiting such electrooptical characteristic can be used to the liquid crystal display of the present invention.

A liquid crystal that exhibits an antiferroelectricity in a certain temperature range is called an antiferroelectric liquid crystal. Among mixed liquid crystals having an antiferroelectric liquid crystal, there are thresholdless antiferroelectric mixed liquid crystals that exhibit an electrooptic response characteristic in which the transmissivity continuously changes with respect to an electric field. Some thresholdless antiferroelectric mixed liquid crystals exhibit a V-shaped electrooptic response characteristic. Some of these thresholdless antiferroelectric mixed liquid crystals have been found to have driving voltages of about ±2.5 V (cell thickness about 1-2 μm).

Figure 23B:
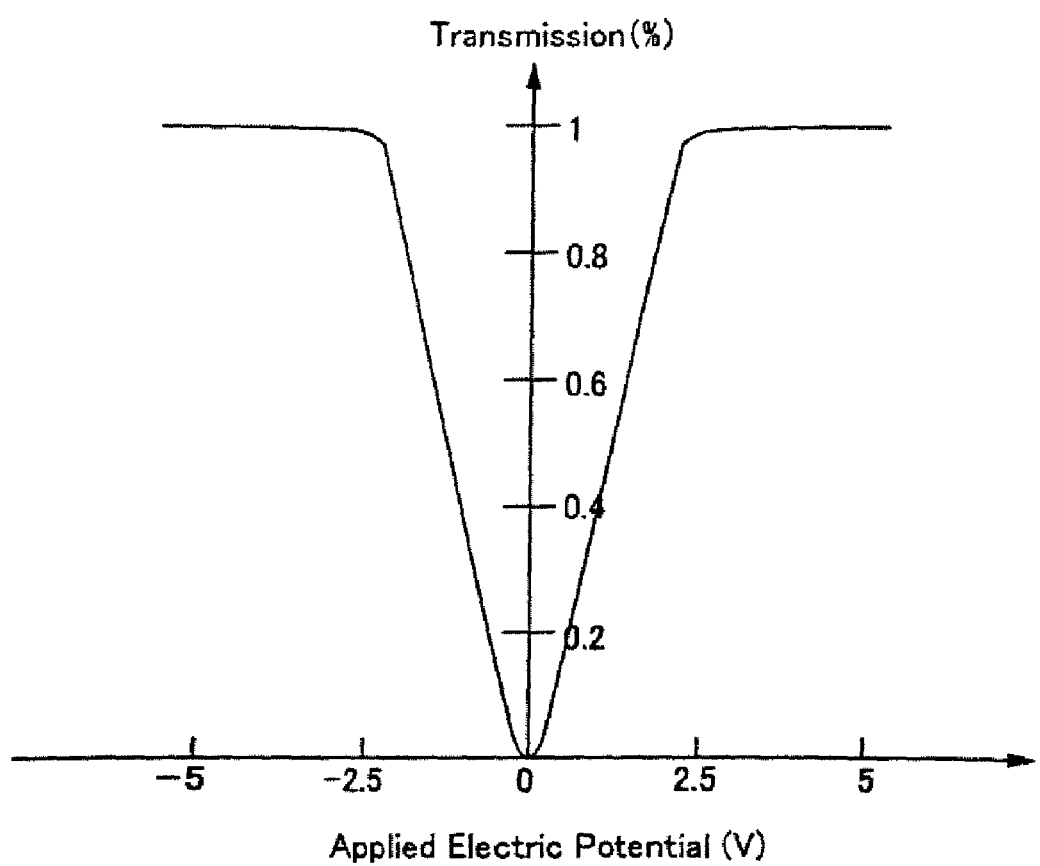

FIG. 23(B) shows a light transmissivity characteristic with respect to an applied voltage for the thresholdless antiferroelectric mixed liquid crystal exhibiting a V-shaped electrooptic response. The ordinate of the graph of FIG. 23(B) represents a transmissivity (in an arbitrary unit) and the abscissa represents an applied voltage. The transmission axis of a polarizing plate on the light receiving side of the liquid crystal display is set almost parallel to a direction normal to the smectic layer of the thresholdless antiferroelectric mixed liquid crystal, the direction being almost aligned with the rubbing direction of the liquid crystal display. The transmission axis of a polarizing plate on the light projecting side is set almost at right angles to the transmission axis of the polarizing plate on the light receiving side (crossed-Nicols arrangement).

FIG. 23(B) shows that the use of such a thresholdless antiferroelectric mixed liquid crystal enables a low voltage driving and a gray scale display.

When the thresholdless antiferroelectric mixed liquid crystal with a low voltage driving is used on a liquid crystal display having an analog driver, the power supply voltage for the video signal sampling circuit can be suppressed to, for example, 5-8 V. Hence, the operation voltage of the driver can be lowered, realizing a reduction in power consumption of the liquid crystal display and enhancing the reliability of the display.

When the thresholdless antiferroelectric mixed liquid crystal with a low voltage driving is used on a liquid crystal display having a digital driver, the output voltage of a D/A converter circuit can be reduced. This enables the operation voltage of the D/A converter circuit to be lowered, which in turn allows the operation voltage of the driver to be reduced, thus realizing reduced power consumption and enhanced reliability of the liquid crystal display.

Therefore, the thresholdless antiferroelectric mixed liquid crystal with a low voltage driving can also be effectively used when the TFTs with a relatively small width of LDD regions (low concentration impurity regions) (e.g., 0-500 nm or 0-200 nm) are used.

Generally, the thresholdless antiferroelectric mixed liquid crystals have large spontaneous polarization and a high dielectric constant of the liquid crystal itself. Hence, when the thresholdless antiferroelectric mixed liquid crystal is used on the liquid crystal display, the pixels are required to have a relatively large storage capacitor. Therefore, a thresholdless antiferroelectric mixed liquid crystal with small spontaneous polarization should preferably be used. Further, it is possible to use a line-sequential driving method as the driving method of the liquid crystal display and elongate the period during which to write a gray scale voltage into a pixel (pixel feed period) in order to compensate for a small storage capacitor.

The use of such a thresholdless antiferroelectric mixed liquid crystal realizes a low voltage driving and therefore a low power consumption of the liquid crystal display.

In the field sequential driving method of this invention, one frame of image is divided into a plurality of subframes, i.e., the period of one image frame is divided into a plurality of subframe periods; red, green and blue images are displayed during the corresponding subframe periods, respectively; and, when these color images are to be displayed, the corresponding red, green and blue backlights are successively turned on. This arrangement can alleviate flicker of image experienced with the conventional display.

What is claimed is:

1. A driving method of a liquid crystal display device comprising:
generating field sequential color video signals by compressing each of original video signals for R, G, B by 1/(3n) times in a time axis direction wherein n is larger than 1; and
supplying the field sequential color video signals to a drive circuit.

2. The driving method according to claim 1 further comprising:
sequentially lighting a red back light, a green back light and a blue back light corresponding to a red image, a green image and a blue image of the field sequential color video signals,
wherein each of the red back light, the green back light and the blue back light comprises an LED.

3. The driving method according to claim 2 wherein the LEDs of the red back light, the green back light and the blue back light are arranged in a stripe shape.

4. The driving method according to claim 2 wherein the LEDs of the red back light, the green back light and the blue back light are arranged in a stripe shape, and each of the LEDs of the red back light, the green back light and the blue back light is deviated from one another in every column.

5. A driving method of a liquid crystal device comprising an LED backlight including a red LED, a blue LED and a green LED, and a liquid crystal panel adjacent to the LED backlight,
wherein the liquid crystal device is driven by an n-fold speed field sequential driving method where n is 2 or greater.

6. The driving method according to claim 5, wherein the red LED, the green LED and the blue LED are arranged in a stripe shape.

7. The driving method according to claim 5, wherein the red LED, the green LED and the blue LED are arranged in a stripe shape and each of the red LED, the green LED and the blue LED is deviated from one another in every column.

8. The driving method according to claim 5, wherein the liquid crystal device comprises a light conductor plate, and light from the red LED, the blue LED and the green LED is introduced into the light conductor plate through a side surface of the light conductor plate and made planar light and then is directed to the liquid crystal panel.

9. A driving method of a liquid crystal device comprising an LED backlight including a red LED, a blue LED and a green LED, and a liquid crystal panel adjacent to the LED backlight,
wherein one image frame comprises n (n is an integer of 2 or more) subframes, each of which comprises a red image, a green image and a blue image, and wherein the red LED, the green LED and the blue LED turn on corresponding to the red image, the green image or the blue image, respectively.

10. The driving method according to claim 9, wherein the red LED, the green LED and the blue LED are arranged in a stripe shape.

11. The driving method according to claim 9, wherein the red LED, the green LED and the blue LED are arranged in a stripe shape and each of the red LED, the green LED and the blue LED is deviated from one another in every column.

12. The driving method according to claim 9, wherein the liquid crystal device comprises a light conductor plate, and light from the red LED, the blue LED and the green LED is introduced into the light conductor plate through a side surface of the light conductor plate and made planar light and then is directed to the liquid crystal panel.

13. A driving method of a liquid crystal device comprising an LED backlight including a red LED, a blue LED and a green LED; and a liquid crystal panel adjacent to the LED backlight, the method comprising:
converting an original video signal into a modified video signal for a field sequential driving of the liquid crystal device, wherein the modified video signal has a greater frame rate than the original video signal.

14. The driving method according to claim 13, wherein the red LED, the green LED and the blue LED are arranged in a stripe shape.

15. The driving method according to claim 13, wherein the red LED, the green LED and the blue LED are arranged in a stripe shape and each of the red LED, the green LED and the blue LED is deviated from one another in every column.

16. The driving method according to claim 13, wherein the liquid crystal device comprises a light conductor plate, and light from the red LED, the blue LED and the green LED is introduced into the light conductor plate through a side surface of the light conductor plate and made planar light and then is directed to the liquid crystal panel.

\* \* \* \* \*